(12) United States Patent
Yang et al.

(10) Patent No.: US 12,529,460 B2
(45) Date of Patent: Jan. 20, 2026

(54) IMAGE PROJECTION DEVICE, AND METHOD FOR MANUFACTURING IMAGE PROJECTION DEVICE

(71) Applicant: NINGBO SUNNY AUTOMOTIVE OPTECH CO., LTD, Ningbo (CN)

(72) Inventors: Jia Yang, Ningbo (CN); Hongxiang Pan, Ningbo (CN); Haitao Lang, Ningbo (CN); Enxin Zhang, Ningbo (CN); Jian Fan, Ningbo (CN); Ke Qi, Ningbo (CN)

(73) Assignee: Ningbo Sunny Automotive Optech Co., Ltd, Ningbo (CN)

( * ) Notice: Subject to any disclaimer, the term of this patent is extended or adjusted under 35 U.S.C. 154(b) by 0 days.

(21) Appl. No.: 18/751,976

(22) Filed: Jun. 24, 2024

(65) Prior Publication Data

US 2024/0344680 A1    Oct. 17, 2024

Related U.S. Application Data

(63) Continuation of application No. PCT/CN2023/078233, filed on Feb. 24, 2023.

(30) Foreign Application Priority Data

Dec. 24, 2021    (CN) .......................... 202111594189.8

(51) Int. Cl.
*F21S 41/29*    (2018.01)
*F21S 41/20*    (2018.01)
(Continued)

(52) U.S. Cl.
CPC ............. *F21S 41/29* (2018.01); *F21S 41/285* (2018.01); *F21V 17/164* (2013.01); *F21W 2102/40* (2018.01)

(58) Field of Classification Search
CPC .......... F21S 41/29; F21S 41/285; G02B 7/021
See application file for complete search history.

(56) References Cited

U.S. PATENT DOCUMENTS 10,253,968 B2 *  4/2019  Cheng .................. F21V 17/164
2005/0179871 A1   8/2005  Kobayashi et al.
(Continued)

FOREIGN PATENT DOCUMENTS

| CN | 1624574 A | 6/2005 |
| CN | 1786815 A | 6/2006 |

(Continued)

OTHER PUBLICATIONS

Chinese Office Action dated Apr. 6, 2022 in Application No. 202111594189.8.
(Continued)

*Primary Examiner* — Zheng Song
(74) *Attorney, Agent, or Firm* — Sughrue Mion, PLLC

(57) ABSTRACT

Provided in the present disclosure are an image projection device, and a method for manufacturing the image projection device. The image projection device comprises: an illumination assembly for emitting a light beam; and a first optical component, which is used for allowing light emitted by the illumination assembly to pass through. The image projection device is characterized in further comprising: a first fastening member, which is arranged on the first optical component; a second optical component, which is used for allowing the light passing through the first optical component to pass through; and a second fastening member, which is arranged on the second optical component and adapted to be fastened to the first fastening member, so as to assemble the first optical component and the second optical component as a whole.

20 Claims, 13 Drawing Sheets

(51) Int. Cl.
*F21V 17/16* (2006.01)
*F21W 102/40* (2018.01)

(56) References Cited

U.S. PATENT DOCUMENTS

| | | | |
|---|---|---|---|
| 2005/0271312 A1 | 12/2005 | Uchiyama et al. | |
| 2007/0076427 A1* | 4/2007 | Reo | F21V 29/70 |
| | | | 362/555 |
| 2012/0236270 A1 | 9/2012 | Maruyama | |
| 2013/0063671 A1 | 3/2013 | Yun et al. | |
| 2013/0335710 A1 | 12/2013 | Okamoto et al. | |
| 2015/0341605 A1 | 11/2015 | Yamada et al. | |
| 2017/0003472 A1* | 1/2017 | Fu | G02B 5/005 |
| 2017/0059975 A1 | 3/2017 | Aizaki | |
| 2020/0012066 A1* | 1/2020 | Yin | H04N 23/57 |
| 2021/0373274 A1* | 12/2021 | Naney | G02B 7/021 |

FOREIGN PATENT DOCUMENTS

| | | | | |
|---|---|---|---|---|
| CN | 101135745 A | | 3/2008 | |
| CN | 101526672 A | | 9/2009 | |
| CN | 101917632 A | | 12/2010 | |
| CN | 102518964 A | | 6/2012 | |
| CN | 102566233 A | | 7/2012 | |
| CN | 102955216 A | | 3/2013 | |
| CN | 102999181 A | | 3/2013 | |
| CN | 104865680 A | | 8/2015 | |
| CN | 206601523 U | | 10/2017 | |
| CN | 107422594 A * | | 12/2017 | G03B 21/208 |
| CN | 107589636 A | | 1/2018 | |
| CN | 206930891 U | | 1/2018 | |
| CN | 207164451 U | | 3/2018 | |
| CN | 207216270 U | | 4/2018 | |
| CN | 208207329 U | | 12/2018 | |
| CN | 109143530 A * | | 1/2019 | G02B 7/00 |
| CN | 109185825 A | | 1/2019 | |
| CN | 109358402 A | | 2/2019 | |
| CN | 111240138 A | | 6/2020 | |
| CN | 211119173 U | | 7/2020 | |
| CN | 211603804 U | | 9/2020 | |
| CN | 111751953 A | | 10/2020 | |
| CN | 111856850 A | | 10/2020 | |
| CN | 113375120 A | | 9/2021 | |
| CN | 113703272 A | | 11/2021 | |
| CN | 114002900 A | | 2/2022 | |
| CN | 116500746 A * | | 7/2023 | G02B 7/105 |
| EP | 1 492 354 A2 | | 12/2004 | |
| EP | 3 130 962 A1 | | 2/2017 | |
| EP | 4253149 A1 * | | 10/2023 | F21S 43/26 |
| JP | 2005-99116 A | | 4/2005 | |
| JP | 2010-256674 A | | 11/2010 | |
| JP | 2012103529 A * | | 5/2012 | |
| WO | 2015/088087 A1 | | 6/2015 | |

OTHER PUBLICATIONS

International Search Report dated Jun. 25, 2023 in Application No. PCT/CN2023/078233.
Chinese Office Action dated Feb. 16, 2022 in Application No. 202111594189.8.

\* cited by examiner

IMAGE PROJECTION DEVICE, AND METHOD FOR MANUFACTURING IMAGE PROJECTION DEVICE

CROSS-REFERENCE TO RELATED APPLICATIONS

This patent application is a continuation of International Application No. PCT/CN2023/078233, filed on Feb. 24, 2023, which claims the priority from Chinese Patent Application No. 202111594189.8, filed on Dec. 24, 2021 and entitled "IMAGE PROJECTION DEVICE, AND METHOD FOR MANUFACTURING IMAGE PROJECTION DEVICE". Both of the aforementioned applications are hereby incorporated by reference in their entireties.

TECHNICAL FIELD

The present disclosure relates to the field of optical devices, and more specifically to an image projection apparatus and a method for manufacturing an image projection apparatus.

BACKGROUND

With the continuous improvement of the quality of life, a large number of automobiles on the market are equipped with projection lamps. The projection lamps can project different logos onto the corresponding ground area around an automobile. Especially during dark days or night time, the effect of the projection lamps is more obvious.

The projection lamp on the market includes a lighting system, an image generation module and a projection system. Here, the image generation module causes the light emitted by the lighting system to carry image information, and then forms a pattern on a projection plane through the projection system.

Due to the Lambertian distribution characteristic of the lighting lamp on the projection lamp on the market, the brightness at the image generation module is not uniform, for example, the light emitted by the lighting lamps is strong in the central area and weak in the edge area. Accordingly, the pattern on the projection plane is not uniform. Moreover, the projection system equipped by the existing projection lamp has a weak capability to control light, which will easily cause stray light easily if the light emitted by the lighting lamp in the lighting system is not collimated to a high standard, and the stray light will reduce the definition of the projected pattern, making the projection effect of the projection lamp unsatisfactory.

In addition, in order to better correct images, a plurality of lenses are generally designed inside the structure of the projection lamp on the market to make the entire image pass. Here, the size of a single lens is large, and many lenses will make the length of the entire projection lamp too long, make the overall size large, and make the projection range small. When the projection lamp is applied to an automobile, the space of the automobile occupied by the projection lamp is large, and the internal projection system is prone to light crosstalk. In addition, since the processing technique of the projection lamp on the market is complicated, the processing is difficult and the cost is high, and the projection lamp is not easy to assemble in actual use.

SUMMARY

Embodiments of the present disclosure provide an image projection apparatus, comprising: a lighting assembly, configured to emit a light beam; and a first optical component, configured to allow light emitted by the lighting assembly to pass through, wherein the image projection apparatus further comprises: a first snap-fit piece, disposed at the first optical component; a second optical component, configured to allow the light passing through the first optical component to pass through; and a second snap-fit piece, disposed at the second optical component, and adapted to be connected with the first snap-fit piece in a snap-fit fashion to assemble the first optical component and the second optical component integrally.

In a first aspect, the image projection apparatus comprises: an image generation module, configured to allow the light emitted by the lighting assembly to pass through, and cause the light beam that passes through to carry image information; and the first optical component comprises a first compound eye, and the second optical component comprises a second compound eye, wherein the first compound eye and the second compound eye are sequentially disposed, along a direction of the light beam, on a side of the image generation module facing away from the lighting assembly, and are configured to project the light beam carrying the image information.

In some implementations, the image projection apparatus further comprises: a lens barrel; a third snap-fit piece, disposed at the second compound eye; and a fourth snap-fit piece, disposed at the lens barrel, and adapted to be connected with the third snap-fit piece in the snap-fit fashion to assemble the second compound eye and the lens barrel integrally.

In some implementations, the image projection apparatus further comprises: a fifth snap-fit piece, disposed at the image generation module; and a sixth snap-fit piece, disposed at the first compound eye, and adapted to be connected with the fifth snap-fit piece in a snap-fit fashion to assemble the image generation module and the first compound eye integrally.

In some implementations, the image generation module comprises a plurality of image generation submodules distributed in a cross section of the light beam, an image generation submodule being configured to cause a sub-light beam passing through the image generation submodule to carry image information; and the first compound eye and the second compound eye respectively comprise a plurality of compound-eye units distributed in the cross section of the light beam, wherein compound-eye units of the first compound eye and the second compound eye that correspond to the same image generation submodule are configured to project a sub-light beam carrying image information and passing through the image generation submodule.

In a second aspect, the image projection apparatus further comprises: an image generation module, configured to allow the light emitted by the lighting assembly to pass through, and cause the light beam that passes through to carry image information; and one of the first optical component and the second optical component comprises a first compound eye, and the other one of the first optical component and the second optical component comprises a lens barrel, wherein, along a direction of the light beam, the first compound eye is disposed on a side of the image generation module facing away from the lighting assembly and is configured to project the light beam carrying the image information.

In some implementations, the image generation module comprises: a third snap-fit piece, disposed at the image generation module; and a fourth snap-fit piece, disposed at the first compound eye, and adapted to be connected with the third snap-fit piece in a snap-fit fashion to assemble the image generation module and the first compound eye integrally.

In some implementations, the image generation module comprises a plurality of image generation submodules distributed in a cross section of the light beam, an image generation submodule being configured to cause a sub-light beam passing through the image generation submodule to carry image information; and the image projection apparatus further comprises a second compound eye, wherein the first compound eye and the second compound eye respectively comprise a plurality of compound-eye units distributed in the cross section of the light beam, wherein compound-eye units of the first compound eye and the second compound eye that correspond to the same image generation submodule are configured to project a sub-light beam carrying image information and passing through the image generation submodule.

In some implementations, the first snap-fit piece is disposed at an outer periphery of the first compound eye in a radial direction of the light beam, one of the first snap-fit piece and the second snap-fit piece comprises a protrusion, and the other one of the first snap-fit piece and the second snap-fit piece comprises a snap groove or a snap hook.

In a third aspect, the first optical component comprises an image generation module, configured to allow the light emitted by the lighting assembly to pass through and cause the light beam that passes through to carry image information, and the second optical component comprises a first compound eye, configured to project the light beam carrying the image information.

In some implementations, the first snap-fit piece is disposed at an outer periphery of the image generation module in a radial direction of the light beam, and the first snap-fit piece is a protrusion; and the second snap-fit piece is a snap groove or a snap hook.

In some implementations, the image generation module comprises a plurality of image generation submodules distributed in a cross section of the light beam, an image generation submodule being configured to cause a sub-light beam passing through the image generation submodule to carry image information; and the image projection apparatus further comprises a second compound eye, wherein the first compound eye and the second compound eye respectively comprise a plurality of compound-eye units distributed in the cross section of the light beam, wherein compound-eye units of the first compound eye and the second compound eye that correspond to the same image generation submodule are configured to project a sub-light beam carrying image information and passing through the image generation submodule.

The image projection apparatus based on the first, the second, or the third aspect, in some implementations, the lighting assembly comprises: a lighting lamp; and a light guide, the light guide being configured to receive light emitted by the lighting lamp and converge the light to form a light beam.

In some implementations, the light guide comprises at least one of a TIR lens, a planoconvex lens or a light pipe, and is configured to converge the light to form a light beam having a divergence angle less than or equal to 10°.

In some implementations, the image generation module comprises: a plurality of image generation submodules distributed in a cross section of the light beam, and the image generation submodules are configured to cause the light beam that passes therethrough to carry image information.

In some implementations, the first compound eye includes a plurality of compound-eye units distributed in an array mode in a cross section of the light beam, and a compound-eye unit corresponding to an image generation submodule is configured to project the light beam passing through the image generation submodule and carrying the image information.

Exemplarily, compound-eye units of at least two compound eyes that correspond to the same image generation submodule are configured to project a sub-light beam carrying image information and passing through the image generation submodule.

In some implementations, the compound-eye unit comprises a first side surface facing the light emitted by the lighting assembly and a second side surface facing away from the light emitted by the lighting assembly.

In some implementations, at least two comprise: a first compound-eye unit, a first side surface of the first compound-eye unit being a flat surface, a convex surface, or a concave surface, and a second side surface of the first compound-eye unit being a convex surface; and a second compound-eye unit located at a light emitting side of the first compound-eye unit, a first side surface of the second compound-eye unit being a flat surface, a convex surface, or a concave surface, and a second side surface of the second compound-eye unit being a convex surface.

In some implementations, at least two comprise: a first compound-eye unit, a first side surface of the first compound-eye unit being a convex surface, and a second side surface of the first compound-eye unit being a flat surface; and a second compound-eye unit located at a light emitting side of the first compound-eye unit, a first side surface of the second compound-eye unit being a flat surface, a convex surface, or a concave surface, and a second side surface of the second compound-eye unit being a convex surface.

In some implementations, the image projection apparatus further comprises: a light blocking device, located on a side, on which the lighting assembly emits the light beam, of the lighting assembly, wherein the light blocking device comprises a plurality of light blocking subunits distributed in a cross section of the light beam and configured to restrict the light beam.

In some implementations, the plurality of light blocking subunits can be integrally bonded to the plurality of compound-eye units in a one-to-one correspondence.

In some implementations, an adjoining surface of the light blocking subunit comprises at least one of a flat surface or a curved surface.

In some implementations, the image generation submodule is adjoined to the lighting assembly integrally, or the image generation submodule is adjoined to the compound-eye unit integrally.

In some implementations, an adjoining surface of the image generation submodule comprises at least one of a flat surface or a curved surface.

In some implementations, an image generation submodule comprises a blocking part, the blocking part defining a light-transmission portion configured to allow the sub-light beam to pass through.

In some implementations, a radius of curvature Ra of the first side surface of the compound-eye unit and a radius of curvature Rb of the second side surface of the compound-eye unit satisfy: $0 \le |Rb/Ra| \le 10$.

In some implementations, a field-of-view FOV of the projection unit group provided in the present disclosure satisfies: $20° \le FOV \le 120°$.

In some implementations, an f-number FNO of the compound-eye unit group formed by at least one compound-eye unit corresponding to the image generation submodule satisfies: FNO≤5.

In some implementations, a total track length TOTL of the projection unit group formed by at least one compound-eye unit corresponding to the image generation submodule satisfies: 0.5 mm≤TOTL≤40 mm.

In some implementations, at least one compound-eye unit corresponding to an image generation submodule forms a compound-eye unit group; and a distance U between a first side surface of a compound-eye unit closest to the lighting assembly in the compound-eye unit group and the image generation submodule and a total effective focal length F of the compound-eye unit group satisfy: 0≤U/F≤10.

In some implementations, the total track length TOTL of the projection unit group formed by at least one compound-eye unit corresponding to the image generation submodule and a total effective focal length F of the projection unit group satisfy: 0.2≤TOTL/F≤50.

In some implementations, the image projection apparatus further comprises: a light supply compound eye, located between the lighting assembly and the image generation module and comprising a plurality of light supply compound-eye units distributed in the cross section of the light beam, wherein a light supply compound-eye unit is configured to adjust light irradiated to a corresponding image generation submodule; and the image projection apparatus satisfies: f≥(t*h+L*d)/(L−h), wherein t is a thickness of the light supply compound-eye unit on an optical axis thereof, f is a back focal length of the light supply compound-eye unit on a side facing away from the lighting assembly, L is a diagonal length of the light supply compound-eye unit, h is a length of an effective light-transmission portion of the image generation submodule in a direction of a diagonal of the light supply compound-eye unit, and d is a distance between the image generation submodule and a second side surface of the light supply compound-eye unit.

In a fourth aspect, embodiments of the present disclosure provide a method for manufacturing an image projection apparatus, comprising: connecting a first snap-fit piece disposed at a first optical component and a second snap-fit piece disposed at a second optical component in a snap-fit fashion to assemble the first optical component and the second optical component integrally; and providing a lighting assembly configured to emit a light beam, wherein the first optical component is configured to allow light emitted by the lighting assembly to pass through, and the second optical component is configured to allow the light passing through the first optical component to pass through.

In some implementations, the first optical component comprises an image generation module, the image generation module being configured to cause the light beam that passes through to carry image information, and the second optical component comprises a compound eye, the compound eye being configured to project the light beam carrying the image information.

In some implementations, the first optical component and the second optical component respectively comprise a compound eye; and the method further comprises: providing an image generation module, wherein the image generation module is configured to allow the light emitted by the lighting assembly to pass through and cause the light beam that passes through to carry image information, and the first optical component and the second optical component are configured to project the light beam carrying the image information.

In some implementations, one of the first optical component and the second optical component comprises a compound eye, and the other one of the first optical component and the second optical component comprises a lens barrel; and the method further comprises: providing an image generation module, wherein the image generation module is configured to allow the light emitted by the lighting assembly to pass through and cause the light beam that passes through to carry image information, and the compound eye is configured to project the light beam carrying the image information.

In some implementations, the image generation module comprises a plurality of image generation submodules distributed in a cross section of the light beam, and each compound eye comprises a plurality of compound-eye units distributed in the cross section of the light beam, and wherein at least two compound-eye units corresponding to an image generation submodule are configured to project a sub-light beam carrying the image information.

In an implementation, the method further comprises: providing a light blocking subunit configured to restrict the light beam, and bonding the light blocking subunit and one of the plurality of compound-eye units integrally.

In an implementation, the method further comprises: bonding the image generation submodules to the lighting assembly integrally, or bonding the image generation submodules to the compound-eye units.

In an implementation, the method further comprises: providing a plurality of light supply compound-eye units each being between the lighting assembly and a corresponding image generation submodule, wherein a light supply compound-eye unit is configured to adjust light irradiated to a corresponding image generation submodule.

In the image projection apparatus provided in the embodiments of the present disclosure, at least one compound-eye unit forms a compound-eye unit group. The compound-eye unit group has a strong capability to control the light passing through the compound-eye unit group. Each compound-eye unit group in the image projection apparatus has a strong light control capability, and there is low light crosstalk and less stray light between different compound-eye unit groups, and accordingly, the image projection apparatus can project a pattern having high definition and a large projection range.

According to the image projection apparatus provided in the present disclosure, at least two optical components are fixed integrally through a snap-fit fashion, which can reduce the difficulty in processing and assembling the image projection apparatus having a plurality of components. The image projection apparatus is convenient to assemble and disassemble, and has a high assembly efficiency and a low manufacturing cost.

In addition, the plurality of projection unit groups in the image projection apparatus can further project patterns in a superimposed manner, which makes the brightness of the projected patterns uniform.

BRIEF DESCRIPTION OF THE DRAWINGS

After reading detailed descriptions of non-limiting embodiments given with reference to the following accompanying drawings, other features, objectives and advantages of the present disclosure will become more apparent.

REFERENCE NUMERALS

Figure 1:
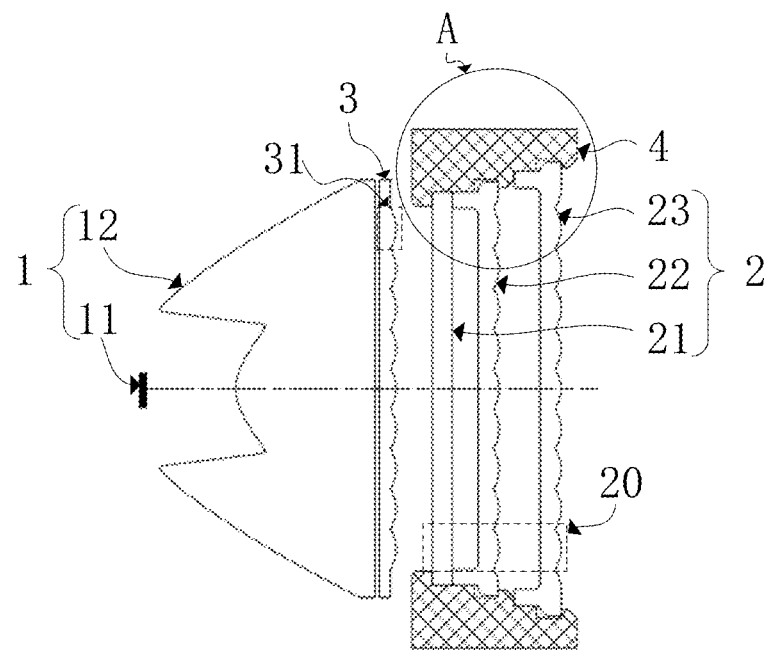
FIG. 1 is a schematic structural diagram of an image projection apparatus according to Embodiment 1 of the present disclosure.

1. Lighting assembly
11. Lighting lamp
12. Light guide
2. Pattern projection assembly
20. Projection unit group
21. Image generation module
211. Image generation submodule
2111. Effective light-transmission portion
212. Peripheral area of the image generation module
22. First compound eye
221. First compound-eye unit
222. Groove of the first compound eye
23. Second compound eye
231. Second compound-eye unit
24. Light blocking device
241. Light blocking subunit
242. Light blocking area
25. Third compound eye
251. Third compound-eye unit
3. Light supply compound eye
31. Light supply compound-eye unit
4. Lens barrel
51. First snap-fit assembly
511. First snap-fit piece
512. Second snap-fit piece
52. Second snap-fit assembly
521. Third snap-fit piece
522. Fourth snap-fit piece
53. Third snap-fit assembly
531. Fifth snap-fit piece
532. Sixth snap-fit piece
S1. First side surface of the first compound-eye unit
S2. Second side surface of the first compound-eye unit
S3. First side surface of the second compound-eye unit
S4. Second side surface of the second compound-eye unit
S5. Second side surface of the light supply compound-eye unit
S6. First side surface of the third compound-eye unit
S7. Second side surface of the third compound-eye unit

DETAILED DESCRIPTION OF EMBODIMENTS

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, without departing from the teachings of the present disclosure, the first compound-eye unit discussed below may also be referred to as the second compound-eye unit and the first optical component may also be referred to as the second optical component, and vice versa.

In the accompanying drawings, the thicknesses, sizes and shapes of the components are slightly exaggerated for the convenience of explanation. The accompanying drawings are merely illustrative and not strictly drawn to scale. For example, the center thickness of the first compound-eye unit and the maximal effective aperture of the first compound-eye unit are not drawn to the scales in the actual production. As used herein, the terms "roughly," "about" and similar terms are used as terms of approximation and not as terms of degree, and are intended to account for the inherent deviations in measured or calculated values that would be recognized by those of ordinary skill in the art.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, represents "one or more implementations of the present disclosure." Also, the term "exemplary" is intended to refer to an example or illustration.

Unless otherwise defined, all expressions (including engineering terms and scientific and technical terms) used herein have the same meaning as commonly understood by those of ordinary skill in the art to which the present disclosure belongs. It should be further understood that words defined in commonly used dictionaries should be interpreted as having a meaning that is consistent with their meaning in the context of the relevant art and will not be interpreted in an idealized or overly formal sense unless expressly stated in the present disclosure.

It should be noted that the embodiments in the present disclosure and the features in the embodiments may be combined with each other on a non-conflict basis. In addition, unless expressly defined or contradicted by the context, the specific steps included in the method described in the present disclosure are not necessarily limited to the recited order, but may be performed in any order or in parallel. The present disclosure will be described below in detail with reference to the accompanying drawings and in combination with the embodiments.

Implementations of the present disclosure provide an image projection apparatus, including a lighting assembly and a pattern projection assembly.

The lighting assembly is configured to emit a light beam. The divergence angle of the light beam may be less than or equal to a predetermined angle (e.g., 10°). Exemplarily, the light beam is collimated light. The light beam emitted by the lighting assembly may be irradiated to the pattern projection assembly.

The pattern projection assembly is disposed on the light emitting side of the lighting assembly, and configured to allow the light emitted by the lighting assembly to pass through. The pattern projection assembly includes a plurality of optical components, for example, an image generation module, at least one binocular and a lens barrel. The compound eye may be disposed on the side of the image generation module facing away from the lighting assembly, and these optical components can make the light emitted by the lighting assembly pass therethrough. The way in which the light passes at least includes: the light beam can pass with a deflection of an optical path; the light beam directly passes through the components without deflecting the optical path of the light beam; and a part of the light beam is blocked and the other part passes through the components.

Exemplarily, the image generation module includes a plurality of image generation submodules distributed in a cross section of the light beam, and the compound eye includes a plurality of compound-eye units distributed in the cross section of the light beam. Exemplarily, the plurality of image generation submodules and the plurality of compound-eye units are respectively distributed in an array mode in a cross section of a chief ray.

The pattern projection assembly may be divided into a plurality of projection unit groups. Each projection unit group may include one image generation submodule and a group of compound-eye units corresponding to the image generation submodule, and the group of compound-eye units may include one compound-eye unit in each compound eye. Each projection unit group is configured to define one projection channel of the light beam. In each projection channel, one sub-light beam can pass. The image generation submodule is configured to allow the light emitted by the lighting assembly to pass through, and cause a passing sub-light beam to carry image information. This group of compound-eye units are configured to project the sub-light beam carrying the image information.

The lens barrel includes an inner cavity. The inner cavity may be configured to be provided with a compound eye, and may be configured to allow the light emitted by the lighting assembly to pass through. Exemplarily, the image projection apparatus includes a plurality of lens barrels. These lens barrels can be connected in series along the direction of the light beam. The plurality of lens barrels can also be arrayed in the cross section of the light beam, and one lighting assembly can correspond to two, four or other numbers of lens barrels. Exemplarily, one lens barrel may include a plurality of inner cavities disposed side by side in the cross section of the light beam.

In some implementations, at least two compound eyes are connected integrally in a snap-fit fashion. When a plurality of compound eyes are included, it is possible that some of the compound eyes are connected integrally in a snap-fit fashion (e.g., the first compound eye and the second compound eye are connected integrally in a snap-fit fashion), or that all the compound eyes are connected integrally in a snap-fit fashion.

Exemplarily, the pattern projection assembly includes a first snap-fit piece and a second snap-fit piece. The first snap-fit piece is disposed at the first compound eye. Exemplarily, the first snap-fit piece may be formed with the first compound eye integrally or at a time. The second snap-fit piece is disposed at the second compound eye. Exemplarily, the second snap-fit piece may be formed with the second compound eye integrally or at a time. The first compound eye can be regarded as a first optical component, and the second compound eye can be regarded as a second optical component.

Alternatively, the first compound eye and the second compound eye are two adjacent components in the compound eyes, and are assembled integrally by connecting the first snap-fit piece and the second snap-fit piece in a snap-fit fashion.

The image projection apparatus provided in the present disclosure is compact in structure, and thus is adapted to be mounted in an equipment with limited mounting space such as an automobile. When used as a vehicle-mounted welcome lamp, the image projection apparatus can be mounted, for example, under a car door to project a pattern onto the ground. The pattern projected by the image projection apparatus is clear.

According to the image projection apparatus provided in the present disclosure, the improvement of the projection effect is realized by providing a plurality of compound eyes, and the aforementioned at least two compound eyes are fixed integrally through a snap-fit fashion, thereby reducing the difficulty in assembling the image projection apparatus. In addition, the difficulty in manufacturing the compound eyes in the image projection apparatus provided in the present disclosure is also low, and the entire image projection apparatus is convenient to assemble and disassemble, and has a high assembly efficiency and a low manufacturing cost.

Exemplarily, each projection unit group is configured to project identical patterns, and these patterns are projected and superimposed onto a projection plane. The superimposed projection patterns have high brightness and uniform brightness.

Exemplarily, the image projection apparatus further includes a light supply compound eye. The a light supply compound eye is located between the lighting assembly and the image generation module, and includes a plurality of light supply compound-eye units distributed in the cross section of the light beam. A light supply compound-eye unit is configured to adjust the light irradiated to a corresponding image generation submodule.

In an exemplary implementation, the image generation module and the compound eye adjacent to the image generation module are assembled integrally through a snap-fit fashion. Specifically, it is possible to regard the image generation module as the first optical component, and the compound eye adjacent to the image generation module as the second optical component. The first optical component is provided with the first snap-fit piece, and the second optical component is provided with the second snap-fit piece. One of the first snap-fit piece and the second snap-fit piece may be disposed as a protrusion, and the other one may be disposed as a snap groove or a snap hook. By connecting the image generation module and the compound eye in a snap-fit fashion, the difficulty in assembling the image projection apparatus can be further reduced. Exemplarily, the image generation module may be fixed integrally with the lighting assembly or the light supply compound eye. In other implementations, an injection molding technique, an embossing technique or the like may be adopted to directly manufacture the image generation module when the compound eye is manufactured or when the light supply compound eye is manufactured, such that the image generation module and the compound eye are manufactured integrally or the image generation module and the light supply compound eye are manufactured integrally.

Exemplarily, the image generation submodule includes a blocking part defining a light-transmission portion configured to allow the sub-light beam to pass through. In an exemplary implementation, an image generation submodule includes a blocking part, the blocking part defining a light-transmission portion configured to allow a sub-light beam to pass through. Exemplarily, the blocking parts of the plurality of image generation submodules may be different from each other. When the brightness of the superimposed projection patterns is not uniform, a blocking part may be additionally disposed at some image generation submodules to block the light-transmission portion, and the additionally disposed block part is in an area of the projection patterns with high brightness. Accordingly, the brightness of this area in the image information carried by the sub-light beams passing through the image generation submodules decreases, and the light intensity of these sub-light beams decreases. By adjusting the image generation submodules, the illumination of the projection patterns superimposed at the projection plane can be adjusted, which makes the illumination of the projection patterns uniform.

In an exemplary implementation, the image projection apparatus further includes a light blocking device disposed on a side on which the lighting assembly emits a light beam. It is possible to choose whether to be equipped with a light blocking device based on the collimation of the light beam emitted by the lighting assembly. When the collimation of the light emitted by the lighting assembly is very low, the light blocking device can be used to directly eliminate the stray light in the system. When the collimation of the light emitted by the lighting assembly is very high, the light blocking device may not be used. Exemplarily, the light blocking device is located between the compound eyes. The light blocking device includes a plurality of light blocking subunits distributed in the cross section of the light beam and configured to restrict the light beam. Specifically, each light blocking subunit is configured to restrict the light beam passing in the projection unit group corresponding to the light blocking subunit. Specifically, the light blocking device may be formed by performing processing such as ink coating on, printing and photolithography on a flat plate, or may be formed by performing processing such as a metal-piece die-casting process and injection molding. Exemplarily, the light blocking device may be configured as an arrayed diaphragm element, and the light blocking subunit may be configured as a diaphragm in the arrayed diaphragm element.

Exemplarily, the image generation submodules are integrally bonded to the lighting assembly. Exemplarily, the image generation submodules are integrally bonded to the compound-eye units. Bonding surfaces of the image generation submodules for bonding to the lighting assembly and/or the bonding surfaces of the image generation submodules for bonding to the compound eye units include at least one of a flat surface and a curved surface. Exemplarily, the plurality of light blocking subunits can be integrally bonded to the plurality of compound-eye units in a one-to-one correspondence. The bonding surfaces of the light blocking subunits and the compound-eye units include at least one of the flat surface and the curved surface. The first side surfaces and the second side surfaces of the image generation submodules/the light blocking subunits can be used as bonding surfaces. Exemplarily, the first side surfaces of the light blocking subunits face the light emitted by the lighting assembly, and the second side surfaces of the light blocking subunits face away from the light emitted by the lighting assembly.

Exemplarily, a compound-eye unit includes a first side surface facing the light emitted by the lighting assembly and a second side surface facing away from the light emitted by the lighting assembly.

In an exemplary implementation, a radius of curvature Ra of the first side surface of the compound-eye unit in the implementation of the present disclosure and a radius of curvature Rb of the second side surface of the compound-eye unit satisfy: $0 \leq |Rb/Ra| \leq 10$. When the compound-eye unit satisfies this conditional expression, light with a large angle can be better controlled. Accordingly, the projection unit group has a high imaging capability and a large field of view, which enables the pattern projected by the projection unit group to be clear and have a large range. Further, the compound-eye unit may satisfy: $0 \leq |Rb/Ra| \leq 5$.

In an exemplary implementation, a total track length TOTL of the projection unit group provided in the present disclosure satisfies: $0.5 \text{ mm} \leq TOTL \leq 40 \text{ mm}$. Specifically, the total track length of the projection unit group is a distance from the first side surface of the image generation submodule to the second side surface of the furthest compound-eye unit on the optical axis of the projection unit group. Since the thickness of the image generating submodule is very small, it is also acceptable to measure the total track length from the second side surface of the image generation submodule. By controlling the total track length of the projection unit group, the image projection apparatus provided in the present disclosure can be miniaturized, and it is conducive to assembling the compound eyes. Further, TOTL may satisfy: 1 mm≤TOTL≤25 mm.

In an exemplary implementation, the total track length TOTL of the projection unit group in the image projection apparatus provided in the present disclosure and a total effective focal length F of the projection unit group satisfy: 0.2≤TOTL/F≤50. When the projection unit group satisfies this conditional expression, the total track length of the projection unit group can be controlled to be within a certain range, thereby ensuring the miniaturization of the image projection apparatus. Further, the projection unit group may satisfy: 0.5≤TOTL/F≤25.

In an exemplary implementation, a field-of-view FOV of the projection unit group provided in the present disclosure satisfies: 20°≤FOV≤120°. When the field-of-view of the projection unit group is within this range, the compound-eye unit included in the projection unit group has a high degree of freedom, and thus can more easily control the light with a large angle. The size of the pattern projected by the projection unit group is large. Further, FOV satisfies: 20°≤FOV≤70°.

In an exemplary implementation, an f-number FNO of the compound-eye unit group formed by at least one compound-eye unit corresponding to the image generation submodule satisfies: FNO≤5. When the f-number FNO of the compound-eye unit group is within this range, the luminous efficacy during the projection is high, and thus the projected pattern is bright.

In an exemplary implementation, a distance U between the image generation submodule and a first side surface of the compound-eye unit closest to the lighting assembly in the compound-eye unit group and a total effective focal length F of the compound-eye unit group satisfy: 0≤U/F≤10. Further, U and F may satisfy: 0≤U/F≤5. If the compound-eye unit group satisfies 0≤U/F≤10, the image generation submodule is located at or near the effective focal plane of the compound-eye unit group, and thus, the pattern can be directly projected onto the target plane. The projection pattern of the compound-eye unit group is clear.

In an exemplary implementation, a thickness t of the light supply compound-eye unit on an optical axis thereof, a back focal length f of the light supply compound-eye unit on a side facing away from the lighting assembly, a diagonal length L of the light supply compound-eye unit, a length h of an effective light-transmission portion of the image generation submodule in a direction of a diagonal of the light supply compound-eye unit, and a distance d between the image generation submodule and a second side surface of the light supply compound-eye unit satisfy: f≥(t*h+L*d)/(L−h). The optical axis of the light supply compound-eye unit may coincide with the direction of the light beam. Here, the second side surface of the light supply compound-eye unit may face away from the light emitted by the lighting assembly. By providing the light supply compound-eye unit, it is possible to cause the light in the sub-light beam mainly irradiate the effective light-transmission portion of the image generation submodule, which can improve the luminous efficacy of the projection unit group, thereby rendering a brighter projected pattern.

The embodiments provided in the present disclosure are described below in detail in combination with FIGS. 1-21.

Embodiment 1

Figure 2:
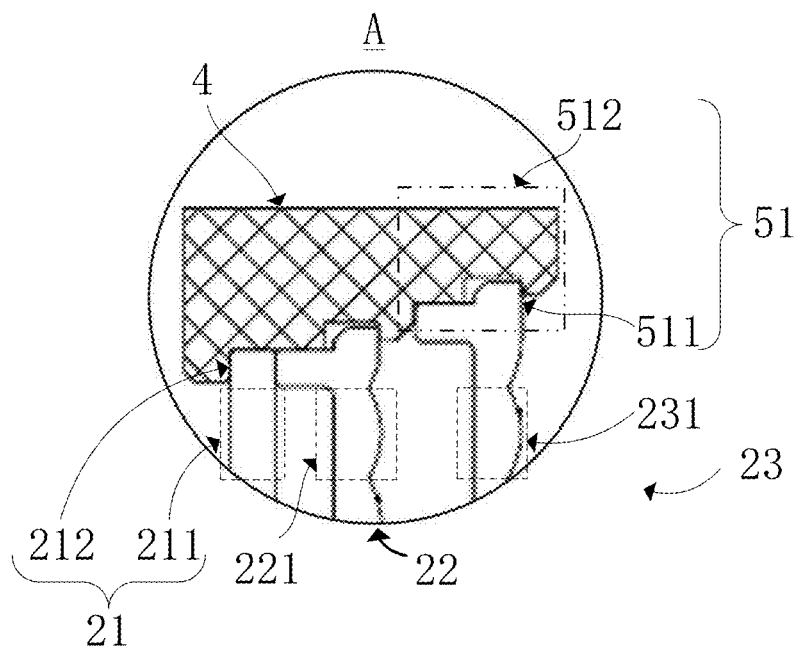
FIG. 2 is an enlarged view of a portion A in FIG. 1.

FIG. 1 is a schematic structural diagram of an image projection apparatus according to Embodiment 1 of the present disclosure. FIG. 2 is an enlarged view of a portion A in FIG. 1. Referring to FIGS. 1 and 2, the image projection apparatus provided in this embodiment includes a lighting assembly 1, a pattern projection assembly 2, a light supply compound eye 3 and a lens barrel 4.

The lighting assembly 1 includes a lighting lamp 11 and a light guide 12. The lighting lamp 11 may be at least one of an LED/LD lighting lamp or a halogen lamp. The light guide 12 may be a lens, and specifically a plano-convex lens or a collimating lens, for example, a TIR lens (total internal reflection collimating lens). In other embodiments, the light guide 12 may alternatively be a light pipe. The lighting lamp 11 emits a light beam and the light beam propagates rightwards. The middle part of the light beam emitted by the lighting lamp 11 propagates roughly rightwards, and the edge part of the light beam emitted by the lighting lamp 11 propagates rightwards after being totally reflected by the side wall of the light guide 12. The light guide 12 receives the light beam and continues to transmit the light beam rightwards. Exemplarily, the light guide 12 may deliver a light beam having a divergence angle less than or equal to a predetermined angle (e.g., 10°). Hereinafter, the light beam delivered from the light guide 12 is referred to as collimated light.

The pattern projection assembly 2 receives the collimated light and then projects the light out. Specifically, the pattern projection assembly 2 may include a plurality of projection unit groups 20. The plurality of projection unit groups 20 are distributed in an array mode in a cross section in the direction of propagation of the collimated light. In other words, the structures of the plurality of projection unit groups 20 may be identical, and then, corresponding identical portions of the plurality of projection unit groups 20 may be distributed in the array mode at the same cross section of the collimated light.

The cross section of the collimated light may be defined as a plurality of channels corresponding to the projection unit groups 20 one by one. The collimated light may be defined as a plurality of sub-light beams, and each sub-light beam corresponds to one projection unit group 20. Generally, the optical axis of the projection unit group 20 coincides with the chief ray of the sub-light beam.

Referring to FIGS. 1-2, the pattern projection assembly 2 may include an image generation module 21, a first compound eye 22, a second compound eye 23, and a first snap-fit assembly 51.

The image generation module 21 includes a plurality of image generation submodules 211. The plurality of image generation submodules 211 are disposed in the cross section in the direction of propagation of the collimated light, for example, disposed integrally in an array mode. In the cross section of the collimated light, different channels are obtained by performing dividing according to the positions at which the image generation submodules 211 are disposed. The image generation module 21 may be provided as a film.

The first compound eye 22 is disposed on a light emitting side of the image generation module 21. The second compound eye 23 is disposed on a light emitting side of the first compound eye. Exemplarily, a plurality of compound eyes are sequentially disposed on the light emitting side of the image generation module 21, the compound eyes being configured to project a light beam carrying image information.

The first compound eye 22 includes a plurality of first compound-eye units 221. The plurality of first compound-eye units 221 corresponds to the image generation submodules 211 one by one. The second compound eye 23 is provided in the same way. As shown in FIG. 2, the first compound-eye unit 221 and the second compound-eye unit 231 corresponding thereto are configured to project light carrying image information, the light being transferred through the image generation submodules 211.

Referring to FIGS. 1 and 2, the lens barrel 4 has an inner cavity in which the image generation module 21, the first compound eye 22 and the second compound eye 23 are disposed.

The first snap-fit assembly 51 includes a first snap-fit piece 511 and a second snap-fit piece 512. The first snap-fit piece 511 is disposed at the second compound eye 23, and the second snap-fit piece 512 is disposed at the lens barrel 4. Exemplarily, a first optical component may include the second compound eye 23, and a second optical component may include the lens barrel 4. The first snap-fit piece 511 and the second snap-fit piece 512 are adapted to be connected in a snap-fit fashion. Exemplarily, the first snap-fit piece 511 includes a protrusion disposed at an outer periphery of the second compound eye 23 in a radial direction of the optical axis, and the second snap-fit piece 512 is a snap groove disposed at the lens barrel 4. In addition, the first optical component may further include the first compound eye 22. The lens barrel 4 may allow the light passing through the first optical component to pass therethrough.

Figure 3:
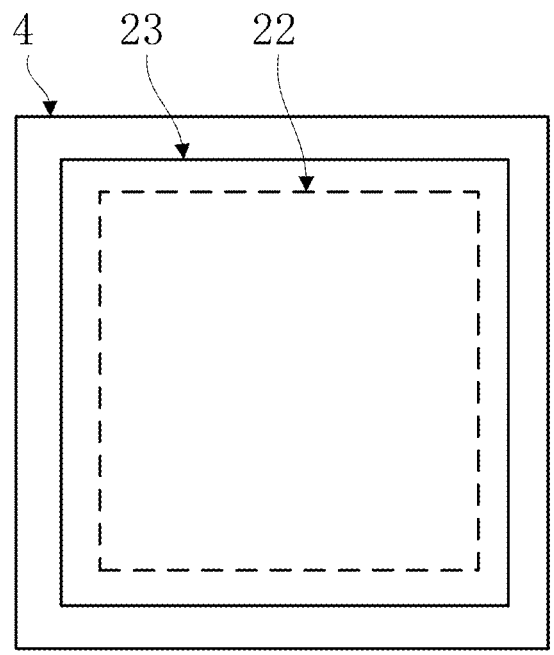
FIG. 3 is a schematic right view of FIG. 1.

Exemplarily, the lens barrel 4 is provided with a plurality of second snap-fit pieces 512, and the second snap-fit pieces 512 are all provided as snap grooves and disposed in an arranging direction of the first compound eye 22 and the second compound eye 23. The snap grooves in each layer are respectively configured to be connected with the first compound eye 22 and the second compound eye 23 at corresponding positions in a snap-fit fashion. As shown in FIG. 3, on a plane perpendicular to the direction of the optical axis, a peripheral contour of the first compound eye 22 can be completely covered by a peripheral contour of the second compound eye 23. The first compound eye 22 can pass through the snap groove at the rear end of the lens barrel 4 to be connected by the snap groove at the front end in a snap-fit fashion, and the first snap-fit piece 511 on the second compound eye 23 is fixed by the snap groove at the rear end of the lens barrel 4 in a snap-fit fashion. In other implementations, the second snap-fit piece 512 on the lens barrel 4 may alternatively be designed as a snap hook. The snap hook is connected with the protrusion disposed at the first compound eye 22 or the protrusion disposed at the second compound eye 23 in a snap-fit fashion, to enable to connect the first compound eye 22 or the second compound eye 23 with respect to the lens barrel 4.

Exemplarily, the image generation module 21 and the first compound eye 22 are integrally connected by the lens barrel 4 in a snap-fit fashion. Here, a peripheral area 212 of the image generation module 21 is clamped and fixed by the first compound eye 22 and the lens barrel 4. Specifically, the first compound eye 22 may include an outer edge protruding along the direction of the optical axis, the outer edge being used for clamping the image generation module 21. Exemplarily, the image generation module 21 may be separately connected by the lens barrel 4 in a snap-fit fashion.

A shape of the snap groove provided in the lens barrel 4 in the cross section of the optical axis may be rectangular. The peripheral contours of the first compound eye 22 and the second compound eye 23 may also be circular, square, polygonal, or the like.

Figure 4:
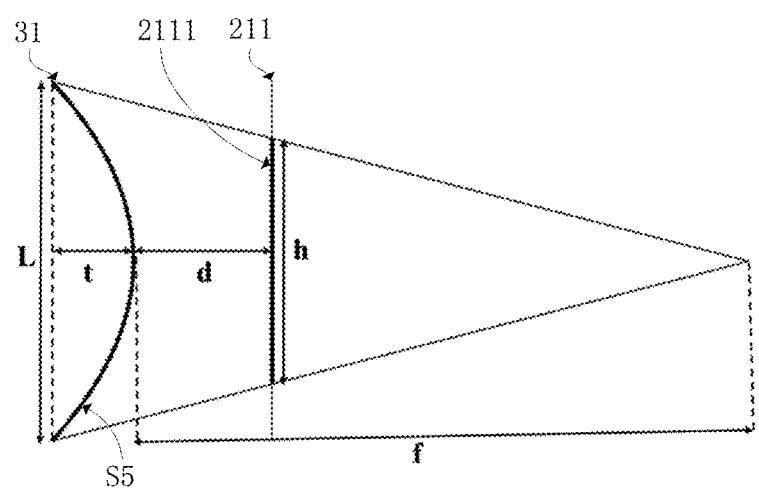
FIG. 4 is a structural relationship diagram of an image generation submodule according to Embodiment 1 of the present disclosure.

The light supply compound eye 3 is located on the light emitting side of the lighting assembly 1 and is configured to adjust the light irradiated to the corresponding pattern projection assembly 2. The light supply compound eye 3 includes a plurality of light supply compound-eye units 31 that are in an array mode. Referring to FIG. 4, exemplarily, the first side surface of the light supply compound-eye unit 31 is a flat surface, and the second side surface S5 of the light supply compound-eye units 31 is a convex surface. Accordingly, the first side surface of the light supply compound eye 3 is a flat surface. Exemplarily, the second side surface of the light guide 12 may be further bonded to the light supply compound eye 3, or the light guide 12 and the light supply compound eye 3 can be made into an integrated structure, to improve the luminous efficacy of the system.

Referring to FIGS. 1 and 4, the light supply compound eye 3 includes a plurality of light supply compound-eye units 31, and the light supply compound-eye units 31 correspond to the projection unit groups 20 one by one. The collimated light emitted from the light guide 12 is converged to the right of the image generation module 21 after passing through the light supply compound eye 3, such that the light beam completely irradiates an image on the image generation submodules 211, thereby completely projecting the pattern.

In an exemplary implementation, as shown in FIG. 4, one sub-light beam of the collimated light passes through the light supply compound-eye unit 31 and the image generation submodule 211 at a time. The thickness of a light supply compound-eye unit 31 on the optical axis thereof is t. Specifically, t is a center distance from the first side surface of the light supply compound-eye unit 31 to the second side surface S5 of the light supply compound-eye unit 31. The back focal length of the light supply compound-eye unit 31 on the side facing away from the lighting assembly 1 is f. Specifically, the back focal length refers to a distance from the second side surface S5 of the light supply compound-eye unit to a focal plane of the light supply compound-eye unit 31. The diagonal length of the light supply compound-eye unit 31 is L (maximal effective clear aperture). In other words, the diagonal length of the light supply compound-eye unit 31 refers to the maximal connection line length of a shape of the light supply compound-eye unit 31 in a vertical plane of the optical axis thereof. For example, when the shape of the light supply compound-eye unit 31 in the vertical plane of the optical axis thereof is a rectangle, the maximal connection line length is the diagonal length of the rectangle. When the shape of the light supply compound-eye unit 31 in the vertical plane of the optical axis thereof is a circle, the maximal connection line length is a diameter of the circle. An effective light-transmission portion 2111 of an image generation submodule 211 has a length h in a direction of the diagonal of the light supply compound-eye unit 31, and a distance between the image generation submodule 211 and the second side surface of the light supply compound-eye unit 31 on the optical axis is d.

Parameters described in the preceding paragraph satisfy the following relationship: $f \geq (t*h+L*d)/(L-h)$. When the image projection apparatus in this embodiment satisfies this conditional expression, the effective light-transmission portion 2111 of the image generation submodule 211 can be defined to be completely located in the optical path of the corresponding light supply compound-eye unit 31, such that the light beam can completely cover the effective light-transmission portion 2111 of the image generation submodule 211. When the image projection apparatus in this embodiment satisfies this conditional expression, more light in the light beam can pass through the effective light-transmission portion 2111, and less light irradiated onto a non-effective light-transmission portion of the image generation submodule 211 can be blocked, which enables an intensity of the light passing through the image generation submodule 211 to be higher, thereby resulting in a high luminous efficacy of the image projection apparatus.

Figure 5:
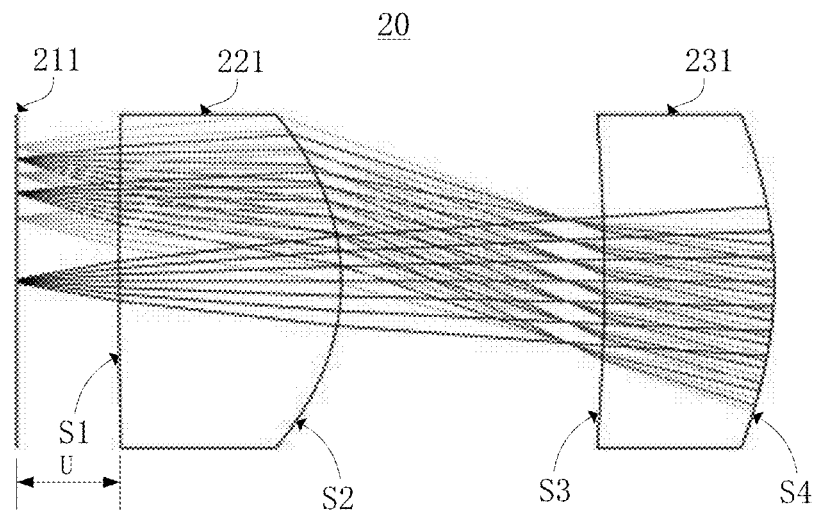
FIG. 5 is a schematic structural diagram of a projection unit group according to Embodiment 1 of the present disclosure.

As shown in FIG. 5, an image generation submodule 211, a first compound-eye unit 221 and a second compound-eye unit 231 are configured to constitute a projection unit group 20. Optical parameters of the projection unit group 20 are specifically described as follows.

A radius of curvature of a first side surface S1 of the first compound-eye unit at a position near an optical axis is |R1|=+∞, and a radius of curvature of a second side surface S2 of the first compound-eye unit at the position near the optical axis is |R2|=0.65 mm. A radius of curvature of a first side surface S3 of the second compound-eye unit at a position near the optical axis is |R3|=+∞, and a radius of curvature of a second side surface S4 of the second compound-eye unit at the position near the optical axis is |R4|=1.32 mm. In other implementations, the first side surface S1 of the first compound-eye unit may be a flat, convex or concave surface, and the second side surface S2 of the first compound-eye unit may be a convex surface. In other implementations, the first side surface S1 of the first compound-eye unit may be a convex surface, and the second side surface S2 of the first compound-eye unit may be a flat surface. Exemplarily, the first side surface S3 of the second compound-eye unit is a flat, convex or concave surface, and the second side surface S4 of the second compound-eye unit is a convex surface.

In an exemplary implementation, the radius of curvature Ra of the first side surface of a compound-eye unit in this implementation and the radius of curvature Rb of the second side surface of the compound-eye unit satisfy 0≤|Rb/Ra|≤10. When at least one of the first compound-eye unit 221 and the second compound-eye unit 231 satisfies this conditional expression, the light with a large angle can be better controlled. Accordingly, the projection unit group has a high imaging capability and a large field of view, and the projection unit group can project a pattern that is clear and has a wide range. In this implementation, Ra is embodied as R1 and R3. Here, R1 is the radius of curvature of the first side surface S1 of the first compound-eye unit and R3 is the radius of curvature of the first side surface S3 of the second compound-eye unit. Rb is embodied as R2 and R4, R2 is the radius of curvature of the second side surface S2 of the first compound-eye unit, and R4 is the radius of curvature of the second side surface S4 of the second compound-eye unit.

Further, the value of a field-of-view FOV of the projection unit group 20 is 40°, a total effective focal length F of the projection unit group 20 is 1.15 mm, and a ratio FNO of the total effective focal length to an entrance pupil diameter is 2.8. A distance from the second side surface S5 of the light supply compound-eye unit to the second side surface S4 of the second compound-eye unit (i.e., the second side surface of the last compound-eye unit in the projection unit group 20) on the optical axis is 3.1 mm. Here, a total track length TOTL of the projection unit group 20 is 2.3 mm.

Exemplarily, a distance U from the first side surface S1 of the first compound-eye unit to the image generation submodule 211 on the optical axis is 0.3 mm.

Figure 6:
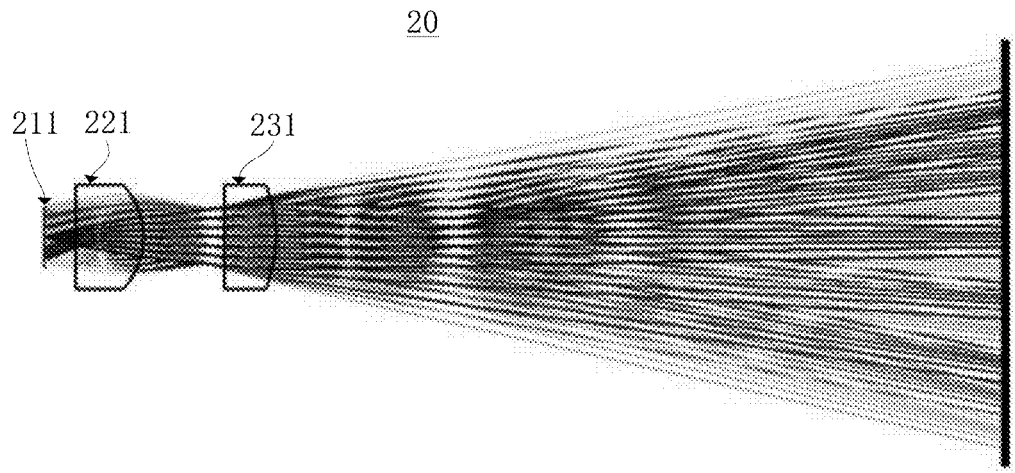
FIG. 6 is a schematic projection state diagram of the projection unit group according to Embodiment 1 of the present disclosure.

As shown in FIG. 6, the projection unit group 20 forms a single projection channel, and the sub-light beam carrying the image information of the image generation submodule 211 is amplified and projected. Each projection channel may magnify, project and superimpose sub-light beam corresponding to each image generation submodule, to form a final projection pattern.

Embodiment 2

Figure 7:
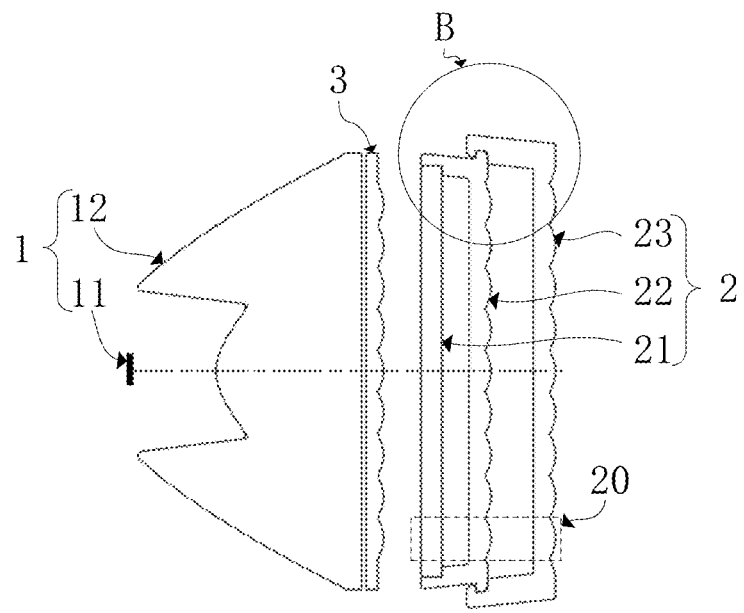
FIG. 7 is a schematic structural diagram of an image projection apparatus according to Embodiment 2 of the present disclosure.
Figure 8:
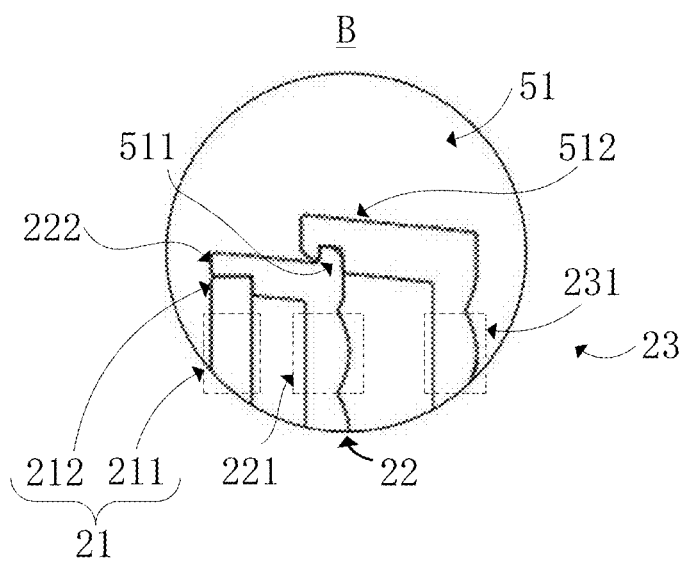
FIG. 8 is an enlarged view of a portion B in FIG. 7.

FIG. 7 is a schematic structural diagram of an image projection apparatus according to Embodiment 2 of the present disclosure. FIG. 8 is an enlarged view of a portion B in FIG. 7. Referring to FIGS. 7 and 8, the image projection apparatus provided in this embodiment includes a lighting assembly 1, a pattern projection assembly 2 and a light supply compound eye 3.

The lighting assembly 1 and the light supply compound eye 3 may be identical with those in Embodiment 1.

The pattern projection assembly 2 in this embodiment includes an image generation module 21, a first compound eye 22, a second compound eye 23, and a first snap-fit assembly 51. On the other hand, the pattern projection assembly 2 may be divided into a plurality of projection unit groups 20 based on a plurality of channels of a light beam. The projection unit groups 20 may also be identical with those in Embodiment 1.

Referring to FIG. 8, in this embodiment, the first compound eye 22 and the second compound eye 23 adjacent to the first compound eye 22 are assembled integrally. The snap-fit assembly 51 includes a first snap-fit piece 511 and a second snap-fit piece 512. The first snap-fit piece 511 includes a protrusion disposed at the outer periphery of the first compound eye 22 in a radial direction of an optical axis, and the second snap-fit piece 512 includes a groove disposed at the second compound eye 23. The protrusion and the groove are adapted to be connected together in a snap-fit fashion. A first optical component may include the first compound eye 22, and a second optical component may include the second compound eye 23.

A peripheral area 212 of the image generation module and the groove 222 of the first compound eye are matched, and fixed by dispensing glue. Exemplarily, one of the first compound eye 22 and the image generation module 21 is provided with a third snap-fit piece (e.g., a snap groove or a snap hook) to be connected with a fourth snap-fit piece disposed at the other one in a snap-fit fashion. Thus, the first compound eye 22 and the image generation module 21 are integrally assembled through a snap-fit fashion. This assembly approach is convenient and fast.

Embodiment 3

Figure 9:
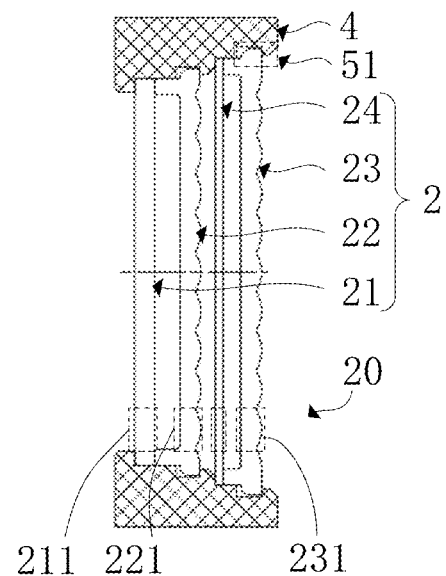
FIG. 9 is a schematic structural diagram of an image projection apparatus according to Embodiment 3 of the present disclosure.

FIG. 9 is a schematic structural diagram of an image projection apparatus according to Embodiment 3 of the present disclosure. Referring to FIG. 9, the image projection apparatus provided in this embodiment includes a lighting assembly (not shown), a pattern projection assembly 2 and a lens barrel 4. Exemplarily, the image projection apparatus provided in this embodiment includes a light supply compound eye (not shown). The lighting assembly and the light supply compound eye in this embodiment may be identical with the components in Embodiment 1. The pattern projection assembly 2 includes an image generation module 21, a first compound eye 22, a second compound eye 23, a light blocking device 24, and a first snap-fit assembly 51. A first optical component may include at least one of the first compound eye 22 and the second compound eye 23, and a second optical component may include the lens barrel 4.

Figure 10:
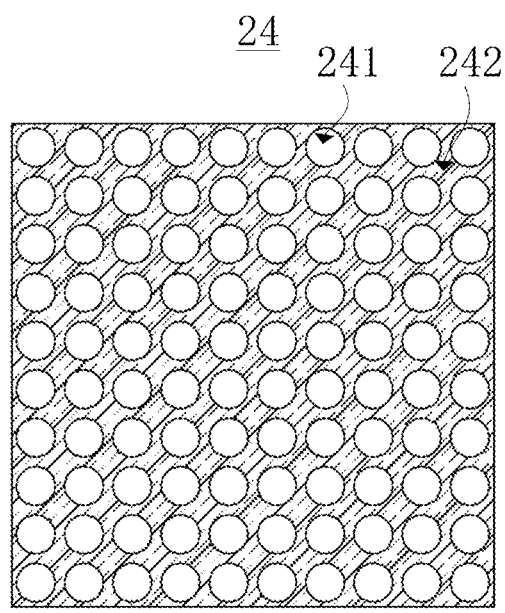
FIG. 10 is a schematic structural diagram of a light blocking device according to Embodiment 3 of the present disclosure.

Referring to FIGS. 9 and 10, exemplarily, the light blocking device 24 is disposed between the first compound eye 22 and the second compound eye 23, and includes a plurality of light blocking subunits 241. The light blocking device 24 may alternatively be disposed at an other position, especially when the pattern projection assembly 2 includes more compound eyes. The plurality of light blocking subunits 241 correspond to image generation submodules 211 one by one. The light blocking subunits 241 are configured to restrict an angle of the passing light beam, such that the projected pattern has no stray light. The image projection apparatus in this embodiment does not have high requirements on the collimation of the light emitted by the lighting assembly 1, and is easy to assemble.

As shown in FIG. 10, the light blocking subunits 241 of the light blocking device 24 are disposed to be hollow in a light blocking area 242. Uniform lighting can be achieved by controlling a size of the light blocking subunit. The light blocking subunits 241 may be arranged in a shape such as a rectangle, hexagon, and an other shape suitable for the arrangement of the compound-eye units. The image generation submodules 211, the first compound-eye units 221, and the second compound-eye unit 231 are arranged in the same way. The shape of a light blocking subunit 241 may be an adaptive shape such as a rectangle or a circle. Exemplarily, a shape of each of the image generation submodules 211, the first compound-eye units 221, and the second compound-eye units 231 is a rectangle of 1 mm×1 mm, but each may have a different light-transmission area. The light blocking subunits 241, each being a circular in shape, are respectively arranged in a matrix of 9×9.

A image generation submodule 211, a first compound-eye unit 221, a light blocking subunit 241, and a second compound-eye unit 231 are configured to constitute a projection unit group 20. Optical parameters of the projection unit group 20 may be identical with those of the projection unit group in Embodiment 1.

Embodiment 4

Figure 11:
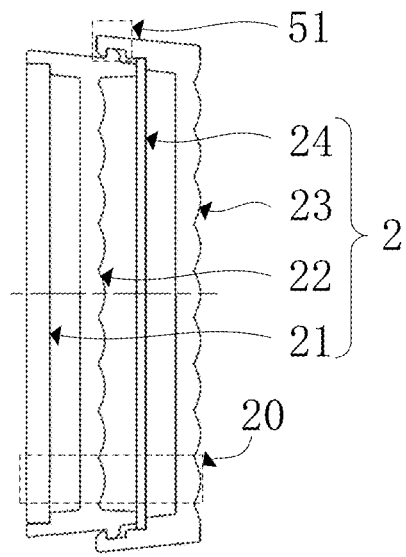
FIG. 11 is a schematic structural diagram of an image projection apparatus according to Embodiment 4 of the present disclosure.

FIG. 11 is a schematic structural diagram of an image projection apparatus according to Embodiment 4 of the present disclosure. Referring to FIG. 11, the image projection apparatus provided in this embodiment includes a lighting assembly (not shown) and a pattern projection assembly 2. Exemplarily, the image projection apparatus provided in this embodiment includes a light supply compound eye (not shown). The lighting assembly and the light supply compound eye in this embodiment may be identical with the components in Embodiment 1.

On the one hand, the pattern projection assembly 2 includes an image generation module 21, a first compound eye 22, a second compound eye 23, a light blocking device 24, and a first snap-fit assembly 51. On the other hand, in a cross section of an optical axis, the pattern projection assembly 2 can be divided into a plurality of projection unit groups 20. The projection unit groups 20 may be identical with those in Embodiment 3.

In this embodiment, the first compound eye 22 and the second compound eye 23 that are adjacent thereto are integrally assembled through the first snap-fit assembly 51. The light blocking device 24 may be clamped and fixed by the first compound eye 22 and the second compound eye 23 that are disposed oppositely on both sides of the light blocking device 24, or may be fixed to one of the first compound eye 22 and the second compound eye 23 by dispensing glue. A first optical component may include the first compound eye 22, and a second optical component may include the second compound eye 23.

A peripheral area 212 of the image generation module 21 and a groove of the first compound eye 22 are fit, and fixed by dispensing glue. In other examples, the pattern projection assembly 2 includes a second snap-fit assembly, and the second snap-fit assembly includes a third snap-fit piece disposed at the first compound eye 22 and a fourth snap-fit piece disposed at the image generation module 21. The third snap-fit piece and the fourth snap-fit piece can be connected together in a snap-fit fashion, to assemble the first compound eye 22 and the image generation module 21 integrally. One of the third snap-fit piece and the fourth snap-fit piece is a snap groove, and the other one is a protrusion at the outer periphery of the component where this one is located.

Embodiment 5

Figure 12:
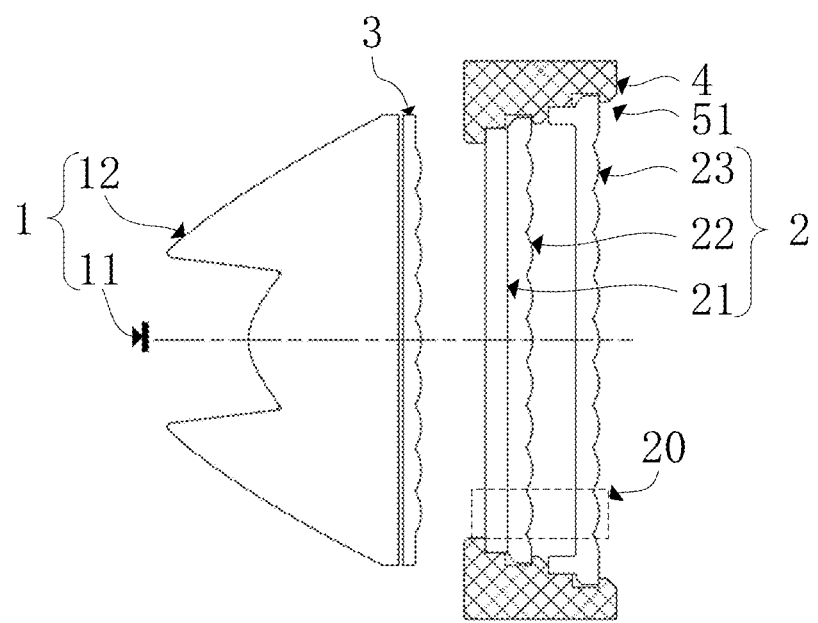
FIG. 12 is a schematic structural diagram of an image projection apparatus according to Embodiment 5 of the present disclosure.

FIG. 12 is a schematic structural diagram of an image projection apparatus according to Embodiment 5 of the present disclosure. Referring to FIG. 12, the image projection apparatus provided in this embodiment includes a lighting assembly 1, a pattern projection assembly 2, a light supply compound eye 3 and a lens barrel 4. The pattern projection assembly 2 includes an image generation module 21, a first compound eye 22, and a second compound eye 23. Either of the first compound eye 22 and the second compound eye 23 can be regarded as a first optical component, and the lens barrel 4 can be regarded as a second optical component.

The lighting assembly 1 includes a lighting lamp 11 and a light guide 12. The light guide 12 and the light supply compound eye 3 may be disposed to be adjoined, and the adjacent surfaces of the light guide 12 and the light supply compound eye 3 are flat surfaces. The second side surface of the image generation module 21 and the first side surface of the first compound eye 22 may also be flat surfaces, and thus can be disposed to be bonded, such that the image generation submodule and the first compound-eye unit are bonded.

Figure 13:
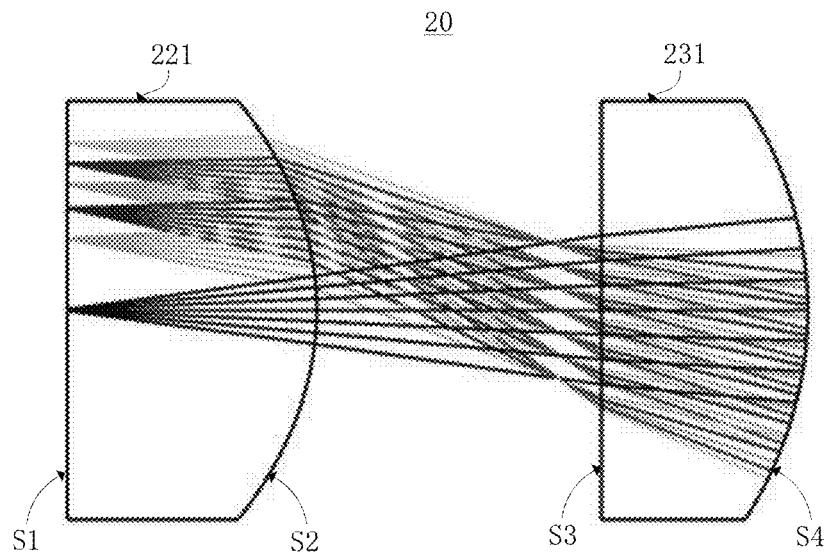
FIG. 13 is a schematic structural diagram of a projection unit group according to Embodiment 5 of the present disclosure.

Specifically, referring to FIG. 13, a first compound-eye unit 221 and a second compound-eye unit 231 are configured to form a projection unit group 20. A radius of curvature of a first side surface S1 of the first compound-eye unit at a position near an optical axis is |R1|=+∞, and a radius of curvature of a second side surface S2 of the first compound-eye unit at the position near the optical axis is |R2|=0.659 mm. A radius of curvature of a first side surface S3 of the second compound-eye unit at a position near the optical axis is |R3|=+∞, and a radius of curvature of a second side surface S4 of the second compound-eye unit at the position near the optical axis is |R4|=0.85 mm. Further, the value of a field-of-view FOV of the projection unit group 20 is 41°, a total effective focal length F of the projection unit group 20 is 1.25 mm, and a ratio FNO of the total effective focal length to an entrance pupil diameter is 2.8.

The image projection apparatus provided in this embodiment has a shorter length, and thus is easy to assemble.

Embodiment 6

Figure 14:
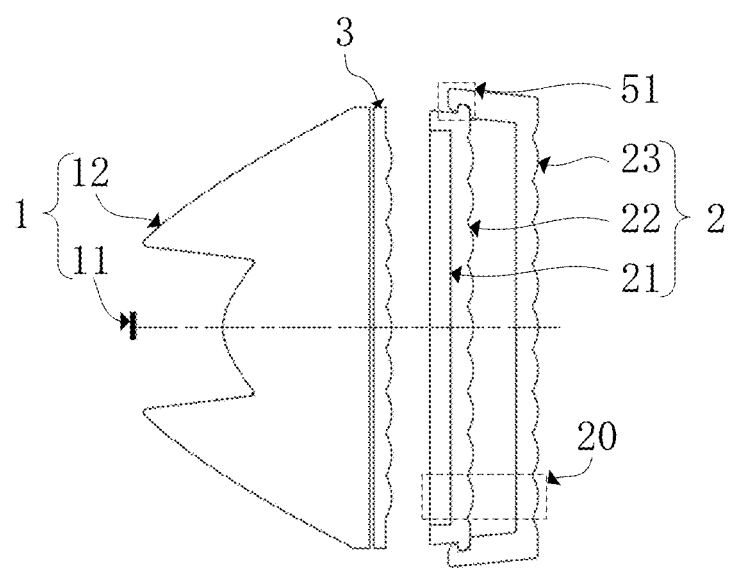
FIG. 14 is a schematic structural diagram of an image projection apparatus according to Embodiment 6 of the present disclosure.

FIG. 14 is a schematic structural diagram of an image projection apparatus according to Embodiment 6 of the present disclosure. Referring to FIG. 14, the image projection apparatus provided in this embodiment includes a lighting assembly 1, a pattern projection assembly 2, and a light supply compound eye 3. The lighting assembly 1 includes a lighting lamp 11 and a light guide 12. The pattern projection assembly 2 includes an image generation module 21, a first compound eye 22, a second compound eye 23, and a first snap-fit assembly 51.

A second side surface of the image generation module 21 and a first side surface of the first compound eye 22 are flat surfaces, and thus can be disposed to be bonded, such that an image generation submodule of the image generation module 21 and a first compound-eye unit of the first compound eye 22 are bonded. The image generation submodule, the first compound-eye unit and a second compound-eye unit of the second compound eye 23 are configured to form a projection unit group 20. The projection unit group 20 and the light supply compound eye 3 may be identical with those in Embodiment 5.

In this embodiment, the first compound eye 22 and the second compound eye 23 are adjacent, and are integrally assembled through the first snap-fit assembly 51. It may be considered that, in this embodiment, a first optical component includes the first compound eye 22 and a second optical component includes the second compound eye 23.

A peripheral area of the image generation module 21 and a groove of the first compound eye 22 are fit, and fixed by dispensing glue. In other implementations, the pattern projection assembly 2 includes a second snap-fit assembly, and the second snap-fit assembly includes a third snap-fit piece disposed at the first compound eye 22 and a fourth snap-fit piece disposed at the image generation module 21. The third snap-fit piece and the fourth snap-fit piece are adapted to be connected together in a snap-fit fashion, such that the first compound eye 22 and the image generation module 21 can be integrally assembled. One of the fourth snap-fit piece and the third snap-fit piece is provided as a snap groove, and the other one is provided as a protrusion at the outer periphery of the component where this one is located.

The image projection apparatus provided in this embodiment has a small number of components and a compact structure, and thus is easy to assemble.

Embodiment 7

Figure 15:
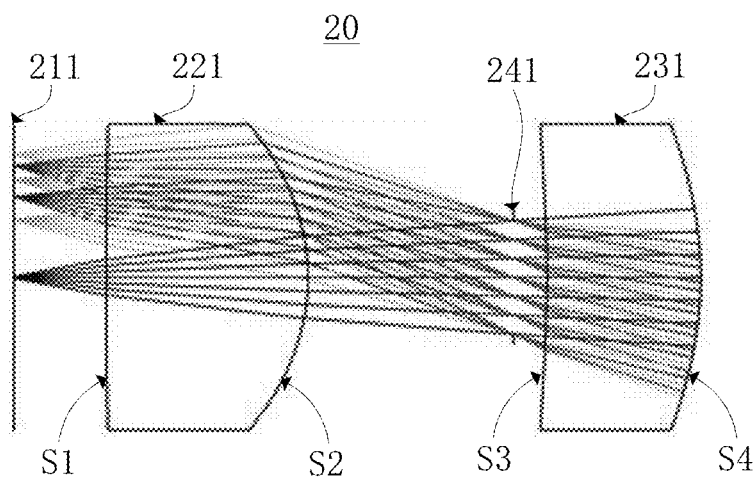
FIG. 15 is a schematic structural diagram of a projection unit group according to Embodiment 7 of the present disclosure.

FIG. 15 is a schematic structural diagram of a projection unit group according to Embodiment 7 of the present disclosure. The image projection apparatus provided in this embodiment differs from the image projection apparatus provided in Embodiment 4 in specific parameters of the projection unit group 20.

The projection unit group 20 in this embodiment includes an image generation submodule 211, a first compound-eye unit 221, and a second compound-eye unit 231. Specifically, a radius of curvature of a first side surface S1 of the first compound-eye unit at a position near an optical axis is |R1|=1.5 mm, and a radius of curvature of a second side surface S2 of the first compound-eye unit at the position near the optical axis is |R2|=0.659 mm. A radius of curvature of a first side surface S3 of the second compound-eye unit at a position near the optical axis is |R3|=1.04 mm, and a radius of curvature of a second side surface S4 of the second compound-eye unit at the position near the optical axis is |R4|=0.779 mm. Further, a value of a field-of-view FOV of the projection unit group 20 is 44°, a total effective focal length F of the projection unit group 20 is 1.25 mm, and a ratio FNO of the total effective focal length to an entrance pupil diameter is 2.8.

In this embodiment, the first side surface S1 of the first compound-eye unit and the second side surface S2 of the first compound-eye unit may both be quadratic surfaces, and the first side surface S3 of the second compound-eye unit and the second side surface S4 of the second compound-eye unit may both be quadratic surfaces. The image projection apparatus provided in this embodiment can better correct aberrations, and thus has a good projection effect.

Embodiment 8

Figure 16:
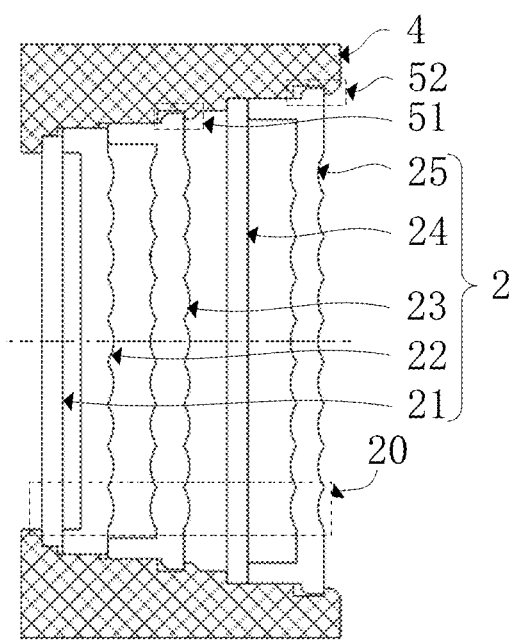
FIG. 16 is a schematic structural diagram of an image projection apparatus according to Embodiment 8 of the present disclosure.

FIG. 16 is a schematic structural diagram of an image projection apparatus according to Embodiment 8 of the present disclosure. The image projection apparatus provided in this embodiment includes a lighting assembly (not shown), a pattern projection assembly 2 and a lens barrel 4. Exemplarily, the image projection apparatus provided in this embodiment includes a light supply compound eye (not shown). The lighting assembly and the light supply compound eye in this embodiment may be identical with the components in Embodiment 2.

On the one hand, the pattern projection assembly 2 includes an image generation module 21, a first compound eye 22, a second compound eye 23, a light blocking device 24, a third compound eye 25, a first snap-fit assembly 51, and a second snap-fit assembly 52. These components of the pattern projection assembly 2 are integrally connected through the lens barrel 4 in a snap-fit fashion. Exemplarily, the image generation module 21 and the first compound eye 22 are pressed against an end of the lens barrel 4 by the second compound eye 23, and the second compound eye 23 is integrally assembled with the lens barrel 4 through the first snap-fit assembly 51. Thus, it may be considered that, in this embodiment, a first optical component includes the second compound eye 23 and a second optical component includes the lens barrel 4.

Exemplarily, the first snap-fit assembly 51 includes a snap groove disposed at the lens barrel 4 and a protrusion disposed at the outer periphery of the second compound eye 23. The light blocking device 24 is pressed, by the third compound eye 25, on a light emitting side of the second compound eye 23 in the lens barrel 4, and the third compound eye 25 is integrally assembled with the lens barrel 4 through the second snap-fit assembly 52. Accordingly, it is also considered that the first optical component includes the third compound eye 25.

On the other hand, in a cross section of an optical axis, the pattern projection assembly 2 can be divided into a plurality of projection unit groups 20.

Figure 17:
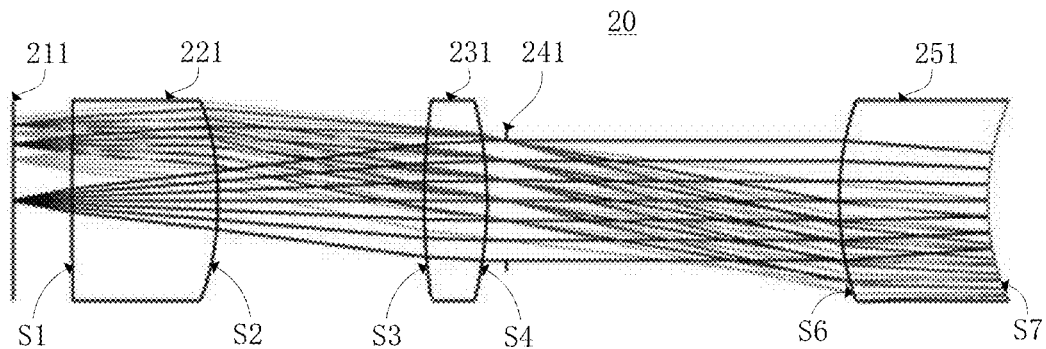
FIG. 17 is a schematic structural diagram of a projection unit group according to Embodiment 8 of the present disclosure.

Referring to FIG. 17, a projection unit group 20 includes an image generation submodule 211, a first compound-eye unit 221, a second compound-eye unit 231, a light blocking subunit 241, and a third compound-eye unit 251. Specifically, a radius of curvature of a first side surface S1 of the first compound-eye unit at a position near an optical axis is |R1|=+∞, and a radius of curvature of a second side surface S2 of the first compound-eye unit at the position near the optical axis is |R2|=1.555 mm. A radius of curvature of a first side surface S3 of the second compound-eye unit at a position near the optical axis is |R3|=3.514 mm, and a radius of curvature of a second side surface S4 of the second compound-eye unit at the position near the optical axis is |R4|=1.84 mm. A radius of curvature of a first side surface S6 of the third compound-eye unit at a position near the optical axis is |R6|=1.516 mm, and a radius of curvature of a second side surface S7 of the third compound-eye unit at the position near the optical axis is |R7|=1.221 mm. Further, a value of a field-of-view FOV of the projection unit group 20 is 50°, a total effective focal length F of the projection unit group 20 is 1.25 mm, and a ratio FNO of the total effective focal length to an entrance pupil diameter is 2.7.

The image projection apparatus in this embodiment includes the first compound eye 22, the second compound eye 23 and the third compound eye 25, that is, each of the projection unit groups 20 includes the first compound-eye unit 221, the second compound-eye unit 231 and the third compound-eye unit 251. The first side surface S1 of the first compound-eye unit and the second side surface S2 of the first compound-eye unit may both be quadratic surfaces. The first side surface S3 of the second compound-eye unit and the second side surface S4 of the second compound-eye unit may both be quadratic surfaces. The first side surface S6 of the third compound-eye unit and the second side surface S7 of the third compound-eye unit may also be quadratic surfaces.

The image projection apparatus provided in this embodiment has a good projection effect, and thus can be applied to a lighting assembly having a lower collimation requirement. The image projection apparatus is suitable for more use environments.

Embodiment 9

Figure 18:
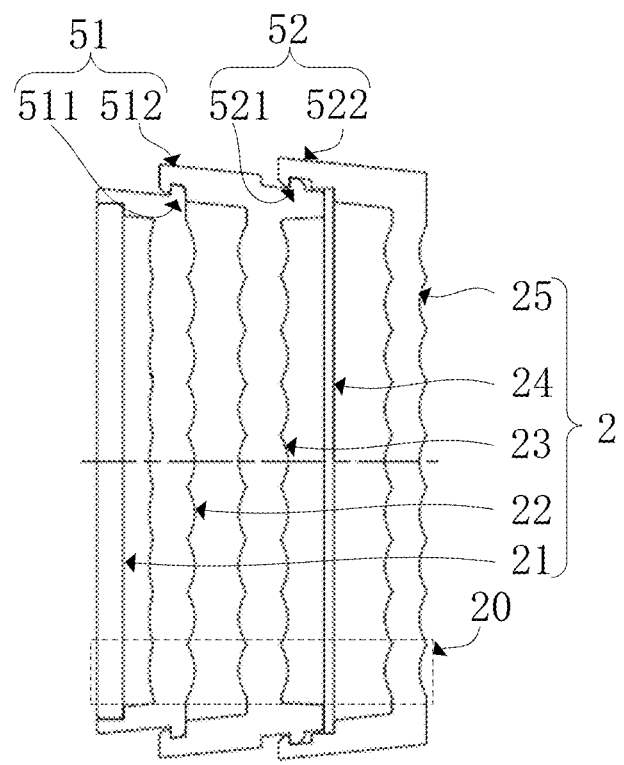
FIG. 18 is a schematic structural diagram of an image projection apparatus according to Embodiment 9 of the present disclosure.

FIG. 18 is a schematic structural diagram of an image projection apparatus according to Embodiment 9 of the present disclosure. The image projection apparatus provided in this embodiment includes a lighting assembly (not shown) and a pattern projection assembly 2. Exemplarily, the image projection apparatus provided in this embodiment includes a light supply compound eye (not shown). The lighting assembly and the light supply compound eye in this embodiment may be identical with the components in Embodiment 8.

On the one hand, in a cross section of an optical axis, the pattern projection assembly 2 can be divided into a plurality of projection unit groups 20.

On the other hand, the pattern projection assembly 2 includes an image generation module 21, a first compound eye 22, a second compound eye 23, a light blocking device 24, a third compound eye 25, a first snap-fit assembly 51, and a second snap-fit assembly 52. Any two adjacent ones of the first compound eye 22, the second compound eye 23 and the third compound eye 25 are snap-fit integrally in a snap-fit fashion.

The first snap-fit assembly 51 includes a first snap-fit piece 511 disposed at the first compound eye 22 and a second snap-fit piece 512 disposed at the second compound eye 23. The second snap-fit assembly 52 includes a third snap-fit piece 521 disposed at the second compound eye 23 and a fourth snap-fit piece 522 disposed at the third compound eye 25. Exemplarily, the first compound eye 22 can be regarded as a first optical component, and the second compound eye 23 can be regarded as a second optical component. In other aspects, the second compound eye 23 can be regarded as the first optical component, and the third compound eye 25 can be regarded as the second optical component.

Exemplarily, the first snap-fit piece 511 includes a protrusion disposed at the outer periphery of the first compound eye 22 in a radial direction of the optical axis, and the second snap-fit piece 512 includes a groove disposed at the second compound eye 23. The first snap-fit piece 511 and the second snap-fit piece 512 can be connected together in a snap-fit fashion. During the connecting, the second snap-fit piece 512 can deform and expand in the radial direction, and then shrink after crossing the first snap-fit piece 511. After being connected, the first snap-fit piece 511 and the second snap-fit piece 512 are fixed in the direction of the optical axis. The third snap-fit piece 521 includes a protrusion disposed at a of the second compound eye 23 in a radial direction of the optical axis, and the fourth snap-fit piece 522 includes a groove disposed at the third compound eye 25. The third snap-fit piece 521 and the fourth snap-fit piece 522 can be connected in a snap-fit fashion.

The image generation module 21 and a groove 222 of the first compound eye 22 can be fit, and fixed by dispensing glue. The light blocking device 24, together with the second compound eye 23, can be connected by the third compound eye 25 in a snap-fit fashion. In other implementations, the pattern projection assembly 2 further includes a third snap-fit assembly. The image generation module 21 can be integrally assembled with the first compound eye 21 through the third snap-fit assembly. Accordingly, the image generation module 21 can be regarded as the first optical component and the first compound eye 22 can be regarded as the second optical component.

The image projection apparatus provided in this embodiment has a small size and a good projection effect.

Embodiment 10

Figure 19:
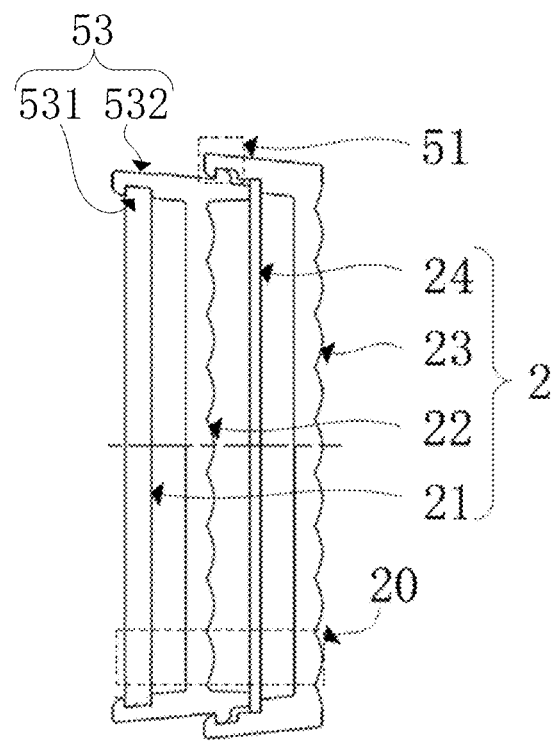
FIG. 19 is a schematic structural diagram of an image projection apparatus according to Embodiment 10 of the present disclosure.

FIG. 19 is a schematic structural diagram of an image projection apparatus according to Embodiment 10 of the present disclosure. The image projection apparatus provided in this embodiment includes a lighting assembly (not shown) and a pattern projection assembly 2. Exemplarily, the image projection apparatus provided in this embodiment includes a light supply compound eye (not shown). The lighting assembly and the light supply compound eye in this embodiment may be identical with the components in Embodiment 8.

On the one hand, in a cross section of an optical axis, the pattern projection assembly 2 can be divided into a plurality of projection unit groups 20.

On the other hand, the pattern projection assembly 2 includes an image generation module 21, a first compound eye 22, a second compound eye 23, a light blocking device 24, a first snap-fit assembly 51, and a third snap-fit assembly 53. The first compound eye 22 and the second compound eye 23 are connected integrally through the first snap-fit assembly 51 in a snap-fit fashion. The image generation module 21 is integrally connected with the first compound eye 22 through the third snap-fit assembly 53 in a snap-fit fashion.

Exemplarily, the first compound eye 22 can be regarded as a first optical component, and the second compound eye 23 can be regarded as a second optical component.

The first snap-fit piece 511 includes a protrusion disposed at the first compound eye 22 and a snap groove disposed at the second compound eye 23. The third snap-fit assembly 53 includes a fifth snap-fit piece 531 disposed at the image generation module 21 and a sixth snap-fit piece 532 disposed at the first compound eye 22. Exemplarily, the fifth snap-fit piece 531 is a protrusion disposed at the outer periphery of the image generation module 21 in a radial direction of the optical axis, and the sixth snap-fit piece 532 is a snap groove. The fifth snap-fit piece 531 and the sixth snap-fit piece 532 can be connected in a snap-fit fashion. After being connected, the fifth snap-fit piece 531 and the sixth snap-fit piece 532 are fixed in the direction of the optical axis.

In an exemplary implementation, it is also possible to regard the image generation module 21 as the first optical component and the first compound eye 22 as the second optical component. The image projection apparatus provided in Embodiment 10 has a small size and a good projection effect.

Embodiment 11

Figure 20:
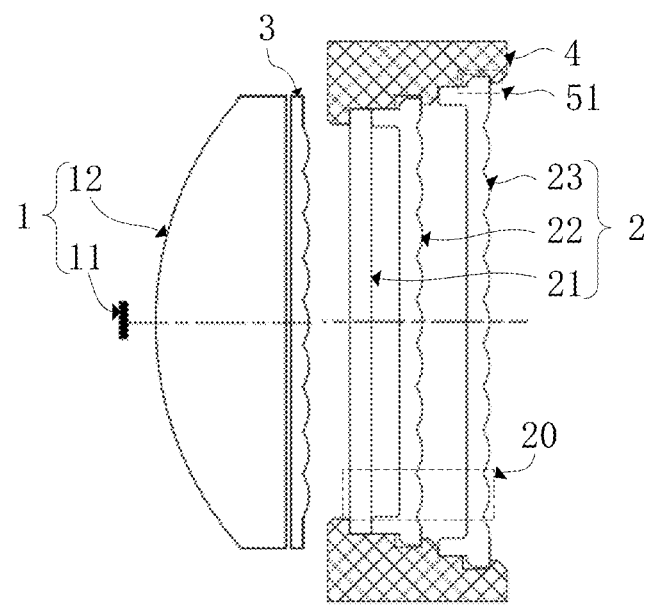
FIG. 20 is a schematic structural diagram of an image projection apparatus according to Embodiment 11 of the present disclosure.

FIG. 20 is a schematic structural diagram of an image projection apparatus according to Embodiment 11 of the present disclosure. The image projection apparatus provided in this embodiment includes a lighting assembly 1, a pattern projection assembly 2, a light supply compound eye 3 and a lens barrel 4.

The lighting assembly 1 in this embodiment includes a lighting lamp 11 and a plano-convex lens 12. A second side surface of the plano-convex lens 12 and a first side surface of the light supply compound eye 3 may be disposed to be bonded. The plano-convex lens 12 and the light supply compound eye 3 may cause the light emitted by the lighting lamp 11 to form a light beam having a divergence angle less than or equal to a predetermined angle (e.g., 10°), and irradiate the light beam to the pattern projection assembly 2.

In this embodiment, the pattern projection assembly 2 and the lens barrel 4 may be provided in the same way as in Embodiment 1. Accordingly, a first optical component may include a first compound eye 22 and a second compound eye 23, and a second optical component may include the lens barrel 4. The image projection apparatus provided in this embodiment is low in cost, is convenient to manufacture, and is easy to assemble.

Embodiment 12

Figure 21:
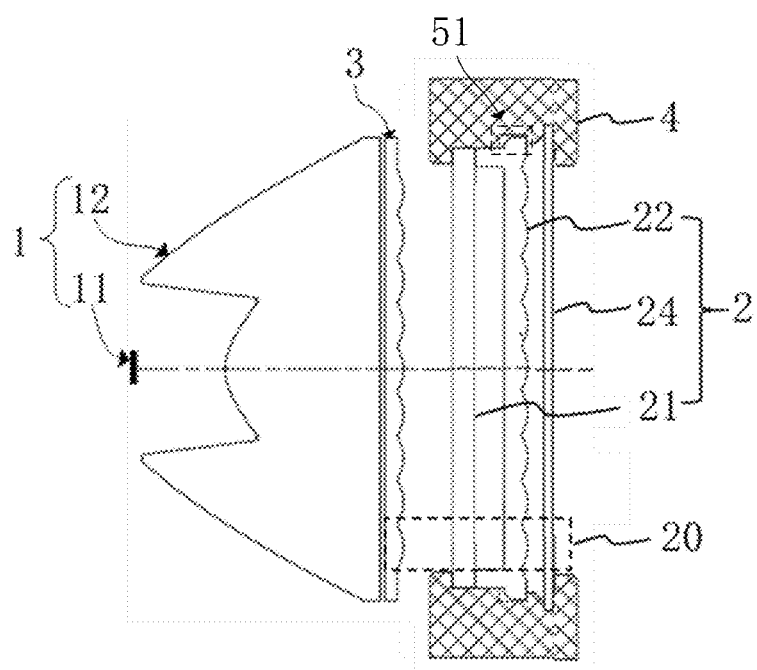
FIG. 21 is a schematic structural diagram of an image projection apparatus according to Embodiment 12 of the present disclosure.

FIG. 21 is a schematic structural diagram of an image projection apparatus according to Embodiment 12 of the present disclosure. The image projection apparatus provided in this embodiment includes a lighting assembly 1, a pattern projection assembly 2, a light supply compound eye 3, and a lens barrel 4.

The lighting assembly 1 includes a lighting lamp 11 and a light guide 12. The light guide 12 and the light supply compound eye 3 may be disposed to be bonded, and the adjacent surfaces of the light guide 12 and the light supply compound eye 3 are flat surfaces.

The pattern projection assembly 2 may include an image generation module 21, a first compound eye 22, a light blocking device 24, and a first snap-fit assembly 51. In other words, the pattern projection assembly 2 may include a plurality of projection unit groups 20. Structures of the plurality of projection unit groups 20 may be identical, and then, corresponding identical portions of the plurality of projection unit groups 20 may be distributed in an array mode at the same cross section of collimated light.

Exemplarily, the image generation module 21 and the first compound eye 22 are mounted in the lens barrel 4. The image generation module 21 is pressed against a portion close to a light incoming side in the lens barrel 4 by the first compound eye 22, and the first compound eye 22 is integrally assembled with the lens barrel 4 through the first snap-fit assembly 51. In this embodiment, the first compound eye 22 can be regarded as a first optical component and the lens barrel 4 can be regarded as a second optical component.

The light blocking device 24 is located on the light emitting side of the first compound eye 22, the pattern projection assembly 2 may further include a second snap-fit assembly, and the light blocking device 24 is integrally assembled with the lens barrel 4. The image projection apparatus provided in this embodiment does not have high requirements on the collimation of the light emitted by the lighting assembly 1, and the image projection apparatus is easy to assemble.

Figure 22:
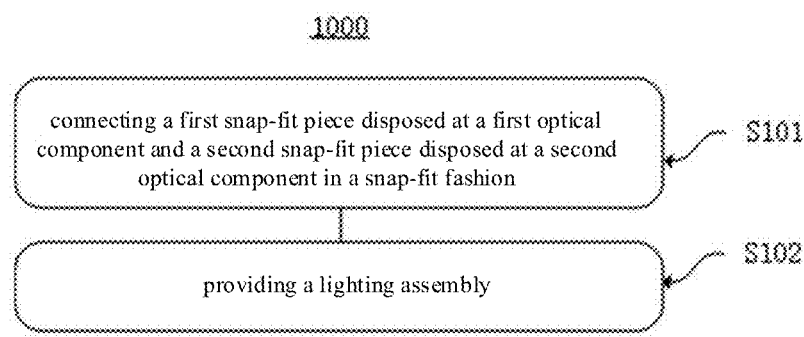
FIG. 22 is a block diagram of a flow of a method for manufacturing an image projection apparatus according to an embodiment of the present disclosure.

Referring to FIG. 22, an embodiment of the present disclosure further provides a method for manufacturing an image projection apparatus, the method 1000 including the following steps.

Step S101, connecting a first snap-fit piece disposed at a first optical component and a second snap-fit piece disposed at a second optical component in a snap-fit fashion.

Step S102, providing a lighting assembly. The lighting assembly is configured to emit a light beam. Exemplarily, a divergence angle of the light beam may be less than or equal to a predetermined angle (e.g., 10°).

Figure 23:
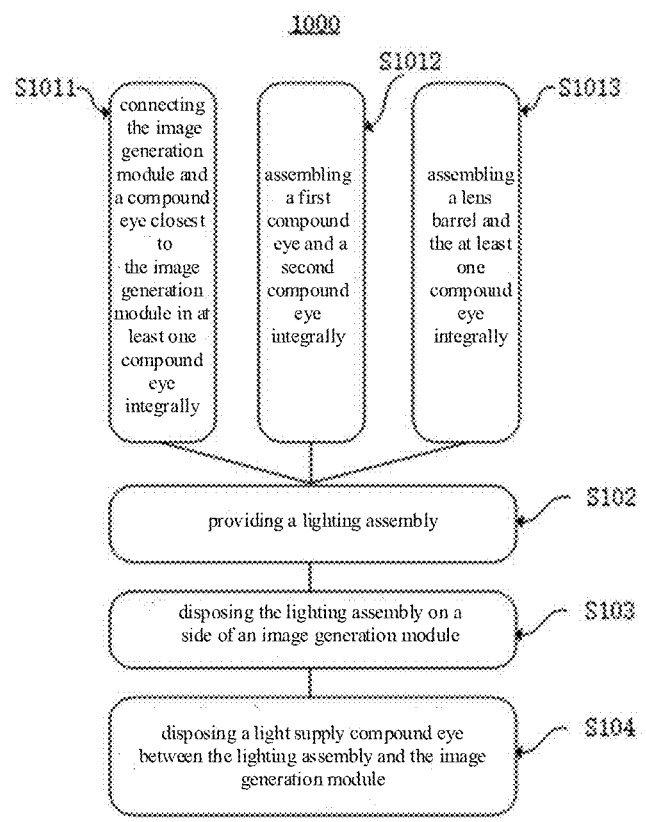
FIG. 23 is a block diagram of a flow of a method for manufacturing an image projection apparatus according to another embodiment of the present disclosure.

Referring to FIG. 23, the method 1000 further includes: disposing the lighting assembly on a side of an image generation module (step S103). The image generation module includes a plurality of image generation submodules distributed in a cross section of the light beam, and the image generation submodules are configured to allow the light emitted by the lighting assembly to pass through and cause the light beam that passes through to carry image information.

Alternatively, the step S101 in the method 1000 may include: connecting the image generation module and a compound eye closest to the image generation module in at least one compound eye integrally (first sub-step S1011) in a snap-fit fashion. The at least one compound eye is sequentially disposed, along a direction of the light beam, on a side of the image generation module facing away from the lighting assembly. Each compound eye includes a plurality of compound-eye units distributed in an array mode in a cross section of the light beam. Here, at least one compound-eye unit corresponding to the image generation submodule is configured to project the light beam carrying the image information. Specifically, the image generation module is provided with the first snap-fit piece, and the compound eye closest to the image generation module is provided with the second snap-fit piece. Accordingly, it can be considered that the image generation module provided with the first snap-fit piece is the first optical component, and the compound eye provided with the second snap-fit piece is the second optical component. The first snap-fit piece and the second snap-fit piece are adapted to be connected together in a snap-fit fashion.

Alternatively, the step S101 in the method 1000 may include: assembling a first compound eye and a second compound eye integrally (second sub-step S1012). At least two compound eyes are sequentially disposed, along the direction of the light beam, on the side of the image generation module facing away from the lighting assembly, and are configured to project the light beam carrying the image information. Specifically, the first compound eye is provided with the first snap-fit piece, and the second compound eye is provided with the second snap-fit piece. Accordingly, it can be considered that the first optical component includes the first compound eye and the second optical component includes the second snap-fit piece. The first snap-fit piece and the second snap-fit piece are adapted to be connected together in a snap-fit fashion. Exemplarily, the first compound eye and the second compound eye are adjacent.

Alternatively, the step S101 in the method 1000 may include a first sub-step S1013: assembling a lens barrel and the at least one compound eye integrally. The at least one compound eye is disposed on the side of the image generation module facing away from the lighting assembly, and is configured to project the light beam carrying the image information. The compound eye is provided with the first snap-fit piece, and the lens barrel is provided with at least one second snap-fit piece, the second snap-fit piece being configured to be connected with a corresponding first snap-fit piece in a snap-fit fashion. In this sub-step, the first compound eye can be regarded as the first optical component and the lens barrel can be regarded as the second optical component.

Exemplarily, the method 1000 further includes: disposing a light supply compound eye between the lighting assembly and the image generation module (step S104). Specifically, the light supply compound eye includes a plurality of light supply compound-eye units distributed in an array mode in the cross section of the light beam. Accordingly, a light supply compound-eye unit is provided as being disposed between the lighting assembly and a corresponding image generation submodule. The light supply compound-eye unit is configured to adjust the light irradiated to the corresponding image generation submodule.

Exemplarily, the method 1000 further includes: disposing a light blocking subunit configured to restrict the light beam, and bonding the light blocking subunit and one of the plurality of compound-eye units integrally.

Exemplarily, the method 1000 further includes: bonding the image generation submodules and the lighting assembly integrally, or bonding the image generation submodules and the compound-eye units integrally.

The foregoing is only a description for the preferred embodiments of the present disclosure and the applied technical principles. It should be appreciated by those skilled in the art that the scope of protection of the present disclosure is not limited to the technical solution formed by the particular combination of the above technical features. The scope of protection should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. An image projection apparatus, comprising: a lighting assembly, configured to emit a light beam; and a first optical component, configured to allow light emitted by the lighting assembly to pass through,
   wherein the image projection apparatus further comprises:
   a first snap-fit piece, disposed at the first optical component;
   a second optical component, configured to allow the light passing through the first optical component to pass through;
   a second snap-fit piece, disposed at the second optical component, and adapted to be connected with the first snap-fit piece in a snap-fit fashion to assemble the first optical component and the second optical component integrally;
   an image generation module, configured to allow the light emitted by the lighting assembly to pass through, and cause the light beam that passes through to carry image information, wherein the image generation module comprises a plurality of image generation submodules distributed in a cross section of the light beam, an image generation submodule being configured to cause a sub-light beam passing through the image generation submodule to carry image information; and
   at least one compound eye,
   wherein the at least one compound eye comprises a first compound eye, wherein the first compound eye comprises a plurality of compound-eye units distributed in the cross section of the light beam, the compound-eye unit of the first compound eye is configured to project a sub-light beam carrying image information and passing through the image generation submodule; or
   wherein the at least one compound eye comprises a first compound eye and a second compound eye, wherein the first compound eye and the second compound eye respectively comprise a plurality of compound-eye units distributed in the cross section of the light beam, wherein compound-eye units of the first compound eye and the second compound eye that correspond to the same image generation submodule are configured to project a sub-light beam carrying image information and passing through the image generation submodule.

2. The image projection apparatus according to claim 1, wherein a distance U between a first side surface of the compound-eye unit and the image generation submodule and a total effective focal length F of the compound-eye unit satisfy: $0 \leq U/F \leq 10$.

3. The image projection apparatus according to claim 2, wherein the at least one compound eye comprises the first compound eye, F is a total effective focal length of a compound-eye unit of the first compound eye; or
   the at least one compound eye comprises the first compound eye and the second compound eye, F is a total effective focal length of a compound-eye unit of the first compound eye and the second compound eye.

4. The image projection apparatus according to claim 1, wherein a total track length TOTL of the compound-eye unit and a total effective focal length F of the compound-eye unit satisfy: $0.2 \leq TOTL/F \leq 50$.

5. The image projection apparatus according to claim 4, wherein the at least one compound eye comprises the first compound eye, TOTL is a total track length of the compound-eye unit of the first compound eye, and F is a total effective focal length of a compound-eye unit of the first compound eye; or
   the at least one compound eye comprises the first compound eye and the second compound eye, TOTL is a total track length of the compound-eye unit of the first compound eye and the compound-eye unit of the second compound eye, and F is a total effective focal length of a compound-eye unit of the first compound eye and the second compound eye.

6. The image projection apparatus according to claim 1, wherein
   a compound-eye unit comprises a first side surface facing the light emitted by the lighting assembly and a second side surface facing away from the light emitted by the lighting assembly, and
   a radius of curvature Ra of the first side surface of the compound-eye unit and a radius of curvature Rb of the second side surface of the compound-eye unit satisfy: $0 \leq |Rb/Ra| \leq 10$.

7. The image projection apparatus according to claim 6, wherein the at least one compound eye comprises the first compound eye, Ra is a radius of curvature of the first side surface of the compound-eye unit of the first compound eye, and Rb is a radius of curvature of the second side surface of the compound-eye unit of the first compound eye; or
   the at least one compound eye comprises the first compound eye and the second compound eye, Ra is a radius of curvature of the first side surface of the compound-eye unit of the first compound eye or the second compound eye, and Rb is a radius of curvature of the second side surface of the compound-eye unit of the first compound eye or the second compound eye accordingly.

8. The image projection apparatus according to claim 1, wherein the at least one compound eye comprises the first compound eye and the second compound eye;
   wherein the first compound eye and the second compound eye are sequentially disposed, along a direction of the light beam, on a side of the image generation module facing away from the lighting assembly, and are configured to project the light beam carrying the image information.

9. The image projection apparatus according to claim 8, further comprising:
a lens barrel;
a third snap-fit piece, disposed at the second compound eye; and
a fourth snap-fit piece, disposed at the lens barrel, and adapted to be connected with the third snap-fit piece in the snap-fit fashion to assemble the second compound eye and the lens barrel integrally; or
a fifth snap-fit piece, disposed at the image generation module; and
a sixth snap-fit piece, disposed at the first compound eye, and adapted to be connected with the fifth snap-fit piece in a snap-fit fashion to assemble the image generation module and the first compound eye integrally.

10. The image projection apparatus according to claim 1, wherein an other one of the first optical component and the second optical component comprises the image generation module;
the first optical component comprises an image generation module, configured to allow the light emitted by the lighting assembly to pass through and cause the light beam that passes through to carry image information, and
the second optical component comprises the at least one compound eye, configured to project the light beam carrying the image information.

11. The image projection apparatus according to claim 10, wherein the first snap-fit piece is disposed at an outer periphery of the image generation module in a radial direction of the light beam, and the first snap-fit piece is a protrusion; and
the second snap-fit piece is a snap groove or a snap hook.

12. The image projection apparatus according to claim 1, wherein an other one of the first optical component and the second optical component comprises a lens barrel, and
wherein, along a direction of the light beam, the at least one compound eye is disposed on a side of the image generation module facing away from the lighting assembly and is configured to project the light beam carrying the image information.

13. The image projection apparatus according to claim 12, further comprising:
a third snap-fit piece, disposed at the image generation module; and
a fourth snap-fit piece, disposed at the at least one compound eye, and adapted to be connected with the third snap-fit piece in a snap-fit fashion to assemble the image generation module and the at least one compound eye integrally.

14. The image projection apparatus according to claim 1, wherein the first snap-fit piece is disposed at an outer periphery of the at least one compound eye in a radial direction of the light beam, one of the first snap-fit piece and the second snap-fit piece comprises a protrusion, and the other one of the first snap-fit piece and the second snap-fit piece comprises a snap groove or a snap hook.

15. The image projection apparatus according to claim 1, wherein the lighting assembly comprises:
a lighting lamp;
a light guide, the light guide being configured to receive light emitted by the lighting lamp and converge the light to form a light beam; and a light supply compound eye, located between the lighting assembly and the image generation module and comprising a plurality of light supply compound-eye units distributed in the cross section of the light beam, wherein a light supply compound-eye unit is configured to adjust light irradiated to a corresponding image generation submodule,
wherein the image projection apparatus satisfies: $f \geq (t^*h + L^*d)/(L-h)$,
wherein t is a thickness of the light supply compound-eye unit on an optical axis thereof,
f is a back focal length of the light supply compound-eye unit on a side facing away from the lighting assembly,
L is a diagonal length of the light supply compound-eye unit,
h is a length of an effective light-transmission portion of the image generation submodule in a direction of a diagonal of the light supply compound-eye unit, and
d is a distance between the image generation submodule and a second side surface of the light supply compound-eye unit.

16. The image projection apparatus according to claim 1, further comprising:
a light blocking device, located on a side, on which the lighting assembly emits the light beam, of the lighting assembly,
wherein the light blocking device comprises a plurality of light blocking subunits distributed in a cross section of the light beam and configured to restrict the light beam; or
wherein an image generation submodule comprises a blocking part, the blocking part defining a light-transmission portion configured to allow the sub-light beam to pass through.

17. The image projection apparatus according to claim 1, wherein an other one of the first optical component and the second optical component comprises at least one compound eye, configured to project the light beam carrying the image information.

18. A method for manufacturing an image projection apparatus, comprising:
connecting a first snap-fit piece disposed at a first optical component and a second snap-fit piece disposed at a second optical component in a snap-fit fashion to assemble the first optical component and the second optical component integrally; and
providing a lighting assembly configured to emit a light beam, wherein the first optical component is configured to allow light emitted by the lighting assembly to pass through, and the second optical component is configured to allow the light passing through the first optical component to pass through,
wherein the method further comprises: providing an image generation module, wherein the image generation module is configured to allow the light emitted by the lighting assembly to pass through and cause the light beam that passes through to carry image information, wherein the image generation module comprises a plurality of image generation submodules distributed in a cross section of the light beam, an image generation submodule being configured to cause a sub-light beam passing through the image generation submodule to carry image information;
wherein one of the first optical component and the second optical component comprises at least one compound eye, wherein the at least one compound eye comprises a first compound eye, wherein the first compound eye comprises a plurality of compound-eye units distributed in the cross section of the light beam, the compound-eye unit of the first compound eye is configured to project a sub-light beam carrying image information and passing through the image generation submodule; or wherein the at least one compound eye comprises a first compound eye and a second compound eye, wherein the first compound eye and the second compound eye respectively comprise a plurality of compound-eye units distributed in the cross section of the light beam, wherein compound-eye units of the first compound eye and the second compound eye that correspond to the same image generation submodule are configured to project a sub-light beam carrying image information and passing through the image generation submodule.

19. The method according to claim 18, wherein the first optical component comprises the image generation module, and the second optical component comprises the at least one compound eye, to project the light beam carrying the image information; or wherein an other one of the first optical component and the second optical component comprises a compound eye and the first optical component and the second optical component are configured to project the light beam carrying the image information; or wherein one of the first optical component and the second optical component comprises the at least one compound eye, and the other one of the first optical component and the second optical component comprises a lens barrel.

20. An image projection apparatus, comprising: a lighting assembly, configured to emit a light beam; and a first optical component, configured to allow light emitted by the lighting assembly to pass through, wherein the image projection apparatus further comprises:

a first snap-fit piece, disposed at the first optical component;

a second optical component, configured to allow the light passing through the first optical component to pass through;

a second snap-fit piece, disposed at the second optical component, and adapted to be connected with the first snap-fit piece in a snap-fit fashion to assemble the first optical component and the second optical component integrally;

an image generation module, configured to allow the light emitted by the lighting assembly to pass through, and cause the light beam that passes through to carry image information, and at least one compound eye;

wherein one of the first optical component and the second optical component comprises the at least one compound eye;

wherein the first snap-fit piece is disposed at an outer periphery of the at least one compound eye in a radial direction of the light beam, one of the first snap-fit piece and the second snap-fit piece comprises a protrusion, and the other one of the first snap-fit piece and the second snap-fit piece comprises a snap groove or a snap hook.

* * * * *